(12) United States Patent
Halachmi

(10) Patent No.: US 8,462,930 B2
(45) Date of Patent: Jun. 11, 2013

(54) METHOD AND APPARATUS FOR NETWORK MAINTENANCE AND SUPERVISION OF AN ON-BOARD CONTROLLED DISPLAY PORTION

(75) Inventor: Zohar Halachmi, Raanana (IL)

(73) Assignee: SellARing Ltd., Raanana (IL)

( * ) Notice: Subject to any disclaimer, the term of this patent is extended or adjusted under 35 U.S.C. 154(b) by 0 days.

(21) Appl. No.: 13/550,759

(22) Filed: Jul. 17, 2012

(65) Prior Publication Data
US 2012/0281822 A1    Nov. 8, 2012

Related U.S. Application Data

(63) Continuation-in-part of application No. 13/059,973, filed as application No. PCT/IL2009/000640 on Jun. 28, 2009.

(60) Provisional application No. 61/090,480, filed on Aug. 20, 2008.

(51) Int. Cl.
*H04M 3/42* (2006.01)
(52) U.S. Cl.
USPC ............. 379/201.04; 379/201.01; 379/207.16
(58) Field of Classification Search
USPC ............. 379/201.04, 201.01, 207.16, 207.02, 379/207.03
See application file for complete search history.

(56) References Cited

U.S. PATENT DOCUMENTS

| | | |
|---|---|---|
| 4,890,315 A | 12/1989 | Bendixen et al. |
| RE34,380 E | 9/1993 | Sleevi |
| 5,652,784 A | 7/1997 | Blen et al. |
| 5,852,775 A | 12/1998 | Hidary |
| 6,041,116 A | 3/2000 | Meyers |
| 6,385,548 B2 | 5/2002 | Ananthaiyer et al. |
| 6,925,166 B1 | 8/2005 | Chan |
| 6,947,527 B2 | 9/2005 | Clark, Jr. et al. |
| 7,130,392 B2 | 10/2006 | Morton |
| 7,162,226 B2 | 1/2007 | Papulov |
| 7,218,956 B2 | 5/2007 | Okawa |
| 7,224,788 B1 | 5/2007 | Rhee et al. |
| 7,251,476 B2 | 7/2007 | Cortegiano |

(Continued)

FOREIGN PATENT DOCUMENTS

| | | |
|---|---|---|
| EP | 1517527 A2 | 9/2003 |
| EP | 1494442 A2 | 1/2005 |

(Continued)

OTHER PUBLICATIONS

LiveWire Mobile Flyer, "Off-Portal Ringback", Downloaded Jul. 23, 2008.

(Continued)

*Primary Examiner* — Thjuan K Addy
(74) *Attorney, Agent, or Firm* — Simon Kahn

(57) ABSTRACT

A method for controlled display on a telephone, the method constituted of: downloading a display portion from a first network to the telephone; detecting a call instance; displaying on the telephone the downloaded display portion responsive to the detected call instance; in the event the data communication module is in communication with the first network, requesting, via the data communication module, a new display portion from the first network; and in the event the data communication module is not in communication with the first network, creating a time stamp and storing the time stamp on a memory of the telephone.

27 Claims, 13 Drawing Sheets

U.S. PATENT DOCUMENTS

| | | |
|---|---|---|
| 7,343,009 B1 | 3/2008 | Clark, Jr. |
| 7,512,420 B2 | 3/2009 | Lichtenfeld et al. |
| 8,160,552 B2 | 4/2012 | Stone |
| 2002/0022476 A1 | 2/2002 | Go |
| 2002/0183048 A1 | 12/2002 | Takeuchi |
| 2003/0050837 A1 | 3/2003 | Kim |
| 2003/0222134 A1 | 12/2003 | Boyd |
| 2005/0021763 A1 | 1/2005 | Izawa |
| 2005/0215238 A1 | 9/2005 | Macaluso |
| 2006/0064350 A1 | 3/2006 | Freer |
| 2006/0259434 A1 | 11/2006 | Vilcauskas, Jr. et al. |
| 2006/0282783 A1* | 12/2006 | Covell et al. ............ 715/744 |
| 2007/0168462 A1 | 7/2007 | Grossberg et al. |
| 2007/0184820 A1 | 8/2007 | Marshall |
| 2007/0189497 A1 | 8/2007 | Bareis |
| 2007/0263798 A1 | 11/2007 | Dewing et al. |
| 2007/0280450 A1 | 12/2007 | Wang |
| 2008/0090562 A1 | 4/2008 | Divis et al. |
| 2008/0120176 A1 | 5/2008 | Batni et al. |
| 2008/0152097 A1 | 6/2008 | Kent |
| 2009/0089144 A1 | 4/2009 | Hodge, Jr. |
| 2009/0089146 A1 | 4/2009 | Teterin |
| 2009/0182616 A1 | 7/2009 | Ho et al. |
| 2010/0135473 A1 | 6/2010 | Dewing et al. |

FOREIGN PATENT DOCUMENTS

| | | |
|---|---|---|
| EP | 1833234 A1 | 9/2007 |
| WO | 0062524 | 10/2000 |
| WO | 0106735 A2 | 1/2001 |
| WO | 0137527 A1 | 5/2001 |
| WO | 2007033358 A2 | 3/2007 |
| WO | 2007057874 A1 | 5/2007 |
| WO | 2007089471 A1 | 8/2007 |
| WO | WO2007140017 A2 | 12/2007 |
| WO | 2008020443 A1 | 2/2008 |
| WO | 2008075331 A2 | 6/2008 |
| WO | 2009011618 A2 | 1/2009 |
| WO | 2010020974 A1 | 2/2010 |

OTHER PUBLICATIONS

LiveWire Mobile Flyer, "Advertising Ringback", Downloaded Jul. 23, 2008.

International Search Report for PCT Application PCT/IL2009/000639 Issued by European Patent Office, of Mailing Date Oct. 27, 2009.

Written Opinion of the International Searching Authority for PCT Application PCT/IL2009/000639 Issued by European Patent Office, of Mailing Date Oct. 27, 2009.

International Search Report for parallel PCT Application PCT/IL2009/000640 Issued by European Patent Office, of Mailing Date Oct. 21, 2009.

Written Opinion of the International Searching Authority for parallel PCT Application PCT/IL2009/000640 Issued by European Patent Office, of Mailing Date Oct. 21, 2009.

Office Action for U.S. Appl. No. 13/059,973 issued by United States Patent and Trademark Office, of mailing date Sep. 28, 2012.

Fraum, "Ad Monetization on WhitePages Caller ID v.3.4", white pages blog, downloaded Nov. 12, 2012.

* cited by examiner

METHOD AND APPARATUS FOR NETWORK MAINTENANCE AND SUPERVISION OF AN ON-BOARD CONTROLLED DISPLAY PORTION

CROSS-REFERENCE TO RELATED APPLICATIONS

The present application is a continuation-in-part of U.S. application Ser. No. 13/059,973, which entered national stage on Feb. 19, 2011 from PCT application PCT/IL2009/000640 filed Jun. 28, 2009, entitled "METHOD AND APPARATUS FOR RINGBACK TONE REPLACEMENT WITH DOWNLOADED AUDIO FILES". U.S. application Ser. No. 13/059,973 claims priority from U.S. provisional application 61/090,480 filed Aug. 20, 2008, entitled "METHOD AND APPARATUS FROM NETWORK MAINTENANCE AND SUPERVISION OF AN ON-BOARD CONTROLLED AUDIO PORTION". The entire contents of each of the above are incorporated herein by reference.

BACKGROUND

The invention relates generally to the field of telephone communications and in particular to a method and apparatus for network maintenance and supervision of a local telephone agent providing controlled audio to a caller until detection of call completion or failure.

Bi-directional voice communication, where one party may select a second party for communication, is generally known as telephone communication. Telephone communication originated with a direct wire connection between the calling party, i.e. the call initiator, and the called party, i.e. the second party, and a switchboard system was developed to enable set up and tear down of connections between the calling party and the called party.

The switchboard system was replaced with automated switching systems, and voice communication developed into a world spanning interconnected set of voice networks. The term telephone, and telephone network, as used throughout this document includes both fixed telephones and mobile phones, as well as voice communication carried apart from dedicated voice networks, including without limitation voice communication carried by Voice over Internet protocol, irrespective as to whether one or more of the parties is communicating by telephone, computer or other device providing voice communication.

Different telephone networks have been seamlessly interconnected, allowing for telephone communication to be initiated from any voice capable station around the world, for connection to any other voice capable station. In most telephone communication systems, an initiating party enters some identification of the party to be called, i.e. the second party, and the telephone network associated with the initiating party begins to set up the call by first identifying the telephone network of the second party, in the event that the second party is not associated with the same telephone network, and then arranging a voice communication path in accordance with the appropriate protocols. Some method of signaling the second party is typically provided by the telephone network associated with the second party, and the second party may select to participate in the telephone communication by signaling a willingness to respond, such as by raising the telephone receiver or pressing the connect button on a mobile telephone. Upon signaling the willingness to respond, a telephone communication channel is typically designated, allowing for bi-directional voice communication.

From the time that the initiating party enters the identification of the party to be called until the telephone communication channel is actually designated there is a time lag. Historically, an audio ring back was provided by the telephone network associated with the called party, with the ring back signal being received at the initiating party telephone instrument and output by an audio output device, such as a speaker. The ring back signal provides audio confirmation that an attempt to access the called party was in progress.

The ring back signal was originally generated by the various telephone networks. Recently, various mobile telephone networks, and suppliers, have implemented personalized ring back tunes, wherein a called party's telephone sends a particular music selection as a ring back signal while signaling the called party. Significant revenue has been generated for the mobile telephone networks by the sales of these downloadable ring back tunes.

Companies such as NMS Communications of Framingham, MA, have further introduced advertising ring back. Such a service enables a called party's telephone to transmit an advertisement as the ring back signal. Unfortunately, incoming calls are received on a seemingly random basis, with no ability for advertisers to target those receiving the advertisement ring back signal. All callers, irrespective of relevance to the advertiser's message, receive the advertisement when they call a telephone which has been signed up for the service.

U.S. Pat. No. 7,224,788 issued May 29, 2007 to Rhee et al., the entire content of which is incorporated herein by reference, is addressed to a voice/text/image commercial information generating method and device operative while waiting for a communication channel to be established. The voice/text/image commercial information generating method and device is associated with one of the telephone network of the initiating telephone, and the telephone network of the called party.

Disadvantageously, in the event that commercial information is generated, no criteria are supplied to arrange for an appropriate advertising mix. In the absence of such an advertising mix, users will quickly tune out the advertisement, or arrange to have the service discontinued. It is interesting to note that Rhee provides for a ring back tone hearing mode, which effectively bypasses any such voice/text/image commercial information.

SUMMARY

Accordingly, it is a principal object of the present invention to overcome at least some of the disadvantages of the prior art. In certain embodiments this is provided by a telephone exhibiting an on-board controlled audio agent. In one embodiment the on-board controlled audio agent is constituted of machine readable instructions stored within the calling telephone and run by a processor of the telephone. A call condition classifier is further provided, either within the telephone, or associated with a telephone network of the initiating telephone. The call condition classifier monitors the condition of the call as the called party is contacted, and classifies the condition of the call as one of awaiting a response, answered and failed. Preferably only upon detection of a human voice response or an answering service response is the call condition determined as answered.

Upon initiation of a telephone call by the initiating telephone, the on-board controlled audio agent outputs a selected one of a plurality of audio portions, and maintains the selected audio portion until the call condition is identified as one of answered and failed. In the event that the call condition is identified as answered, the audio portion is discontinued, and the telephone channel between the initiating telephone and the called telephone is enabled.

In certain embodiments the plurality of audio portions are constituted of advertisements. In certain embodiments associated text, an image or images or a video portion may be further associated with the audio portion for display on a telephone display of the caller.

In certain embodiments, associated with each of the audio portions is at least one reimbursement rule, and the controlled audio agent is operative to select the audio portion responsive to the reimbursement rules. Preferably the controlled audio agent is operative to select the audio portion so as to maximize total reimbursement responsive to the reimbursement rules. In certain embodiments, the controlled audio agent is further operative to prevent repetitive replay of a particular one of said plurality of audio portions overriding the drive to maximize total reimbursement.

In certain embodiments the controlled audio agent maintains a history of audio portions output to the caller, and uploads the history to a network maintenance and supervision agent. The network maintenance and supervision agent is operative to regularly provide updated reimbursement rules and audio portions responsive to the uploaded history. Preferably, the audio portions and reimbursement rules are responsive to user descriptive data of the caller. Preferably user descriptive data comprises at least one of: age, sex, income, job description and preferred hobby.

In certain embodiments a method for network maintenance and supervision of an on-board controlled audio agent is provided, the method comprising: providing a plurality of audio portions, each of the provided audio portions being selected responsive to user descriptive data associated with a call initiator; providing a reimbursement rule associated with each of the audio portions; selecting, for each call instance, a particular one of the plurality of audio portions responsive to the determined reimbursement rules; and outputting the particular one of the plurality of audio portions at each call instance initiation such that at least a portion of the particular audio portion is heard by the call initiator prior to call connection.

In certain embodiments a system for network maintenance and supervision of a locally controlled audio portion is provided, the system comprising: a controlled audio agent on-board a telephone; a memory associated with the controlled audio agent, the memory exhibiting a plurality of audio portions stored thereon responsive to the controlled audio agent; and a network maintenance and supervision agent associated with a telephone network, the network maintenance and supervision agent operative to provide each of the provided audio portions to the controlled audio agent responsive to user descriptive data associated with a caller, each of the provided audio portions having associated therewith a reimbursement rule associated with each of the audio portions, the controlled audio agent operative to: select, for each call instance, a particular one of the plurality of audio portions responsive to the reimbursement rules; and output the particular one of the plurality of audio portions at each call instance initiation such that at least a portion of the particular audio portion is heard by the call initiator prior to call connection.

In one independent embodiment, an apparatus for controlled advertisement display on a telephone is provided, the apparatus comprising: a controlled display agent on-board the telephone; and a data communication module arranged to download a plurality of display portions from a first network to the display agent, each display portion illustrating an advertisement different than the advertisements illustrated by the other display portions, the display agent arranged to: select a particular one of the downloaded display portions; and display on the telephone the selected display portion responsive to a call instance.

In one embodiment, the selected display portion is displayed on the telephone responsive to a call instance termination. In one further embodiment, all of the downloaded display portions are arranged to be displayed responsive to a predetermined number of call instance terminations.

Additional features and advantages of the invention will become apparent from the following drawings and description.

BRIEF DESCRIPTION OF THE DRAWINGS

For a better understanding of various embodiments of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

Figure 1:
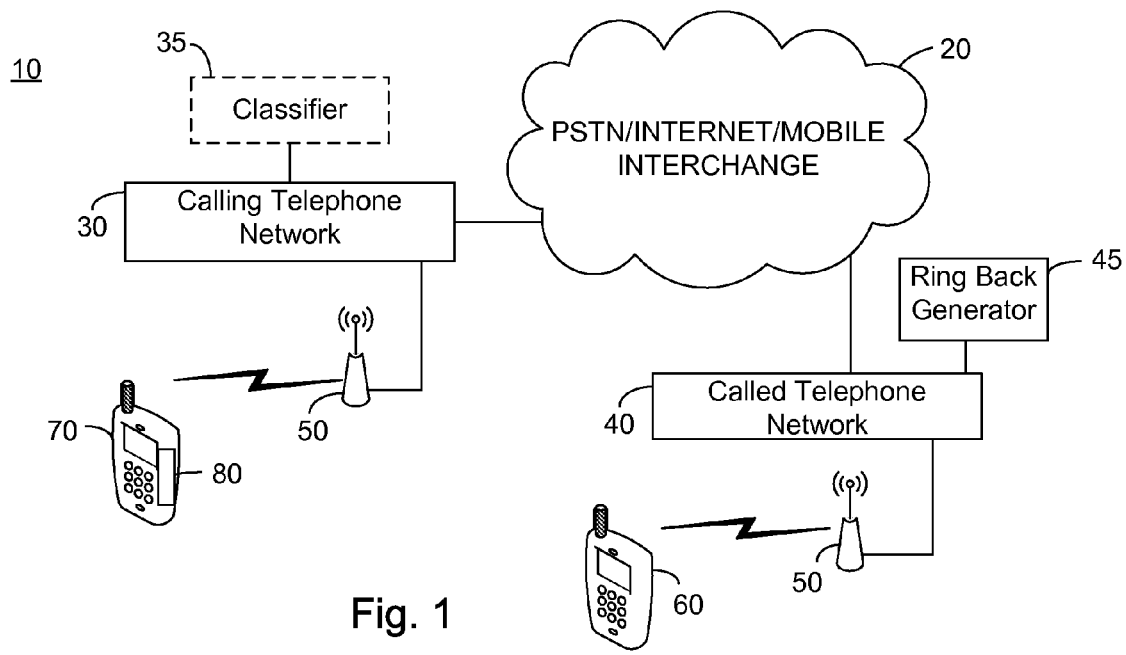
FIG. 1 illustrates a high level schematic diagram of a communication system connecting a calling telephone and a called telephone.

Certain of the present embodiments enable a telephone exhibiting an on-board controlled audio agent. In one embodiment the on-board controlled audio agent is constituted of machine readable instructions stored within the calling telephone and run by a processor of the telephone. A call condition classifier is further provided, either within the telephone, or associated with a telephone network of the initiating telephone. The call condition classifier monitors the condition of the call as the called party is contacted, and classifies the condition of the call as one of awaiting a response, answered and failed. Preferably only upon detection of a human voice response or an answering service response is the call condition determined as answered.

Upon initiation of a telephone call by the initiating telephone, the on-board controlled audio agent outputs a selected one of a plurality of audio portions, and maintains the selected audio portion until the call condition is identified as one of answered and failed. In the event that the call condition is identified as answered, the audio portion is discontinued, and the telephone channel between the initiating telephone and the called telephone is enabled.

In certain embodiments the plurality of audio portions are constituted of advertisements. In certain embodiments associated text, an image or images or a video portion may be further associated with the audio portion for display on a telephone display of the caller.

In certain embodiments, associated with each of the audio portions is at least one reimbursement rule, and the controlled audio agent is operative to select the audio portion responsive to the reimbursement rules. Preferably the controlled audio agent is operative to select the audio portion so as to maximize total reimbursement responsive to the reimbursement rules. In certain embodiments, the controlled audio agent is further operative to prevent repetitive replay of a particular one of said plurality of audio portions overriding the drive to maximize total reimbursement.

In certain embodiments the controlled audio agent maintains a history of audio portions output to the caller, and uploads the history to a network maintenance and supervision agent. The network maintenance and supervision agent is operative to regularly provide updated reimbursement rules and audio portions responsive to the uploaded history. Preferably, the audio portions and reimbursement rules are responsive to user descriptive data of the caller. Preferably user descriptive data comprises at least one of: age, sex, income, job description and preferred hobby.

Before explaining at least one embodiment in detail, it is to be understood that the invention is not limited in its application to the details of construction and the arrangement of the components set forth in the following description or illustrated in the drawings. The invention is applicable to other embodiments being practiced or carried out in various ways. Also, it is to be understood that the phraseology and terminology employed herein is for the purpose of description and should not be regarded as limiting.

FIG. 1 illustrates a high level schematic diagram of a communication system 10 comprising a PSTN/Internet/Mobile interchange 20, a calling telephone network 30, an optional call condition classifier 35, a called telephone network 40, a ring back generator 45, a plurality of cellular antennas 50, a called telephone 60 and a calling telephone 70 comprising therein an on-board controlled audio agent 80. PSTN/Internet/Mobile interchange 20 is in communication with calling telephone network 30 and with called telephone network 40. Calling telephone network 30 is in communication with optional call condition classifier 35 and called telephone network 40 is in communication with ring back generator 45. Calling telephone network 30 is in communication with a plurality of cellular antennas 50, and in particular with the cellular antenna 50 which is in communication with calling telephone 70. Called telephone network 40 is in communication with a plurality of cellular antennas 50, and in particular with the cellular antenna 50 which is in communication with called telephone 60.

Ring back generator 45 is illustrated as a component in communication with called telephone network 40, however this is not meant to be limiting in any way. In one embodiment, ring back generator 45 is embedded within called telephone network 40, and in another embodiment ring back generator 45 is provided by called telephone 60.

In operation, a call instance is initiated from calling telephone 70. Calling telephone network 30 receives a call initiation signal from calling telephone 70 via cellular antenna 50, and is operative to request from called telephone network 40, via PSTN/Internet/Mobile interchange 20, to enable a telephone channel between calling telephone 70 and called telephone 60. Such a channel is enabled cooperatively between calling telephone network 30 and called telephone network 40, and is completed upon called telephone 60 answering. The channel is released upon completion of the telephone call.

The term telephone channel as used herein is not meant to be limiting to a fixed time domain multiplexed channel, and is particularly meant to include a logical channel, such as the logical channel implement by VoIP.

While calling telephone network 30, in cooperation with called telephone network 40, attempts to enable the telephone channel between calling telephone 70 and called telephone 60, on-board controlled audio agent 80 outputs a selected audio portion from calling telephone 70, and blocks any received audio from the called telephone 60 and/or called telephone network 40. A user at calling telephone 70 thus does not hear the output of ring back generator 45, which is operative to generate a ring back tone responsive to signaling of called telephone 60. Optional call condition classifier 35 is in communication with calling telephone network 30 and is operative to continuously monitor the condition of the telephone call. In particular, optional call condition classifier 35 is preferably operative to classify the condition of the call as one of answered, awaiting voice response and failed. Preferably only upon detection of a human voice response or an answering service response is the call condition determined as answered. Call condition classifier 35 is in data communication with on-board controlled audio agent 80, and notifies on-board controlled audio agent 80 of the classified condition of the call. Upon notification from call condition classifier 35 that the call condition is classified as answered, on-board controlled audio agent 80 ceases to output the selected audio portion and enables audio output of the answered telephone channel.

Figure 2:
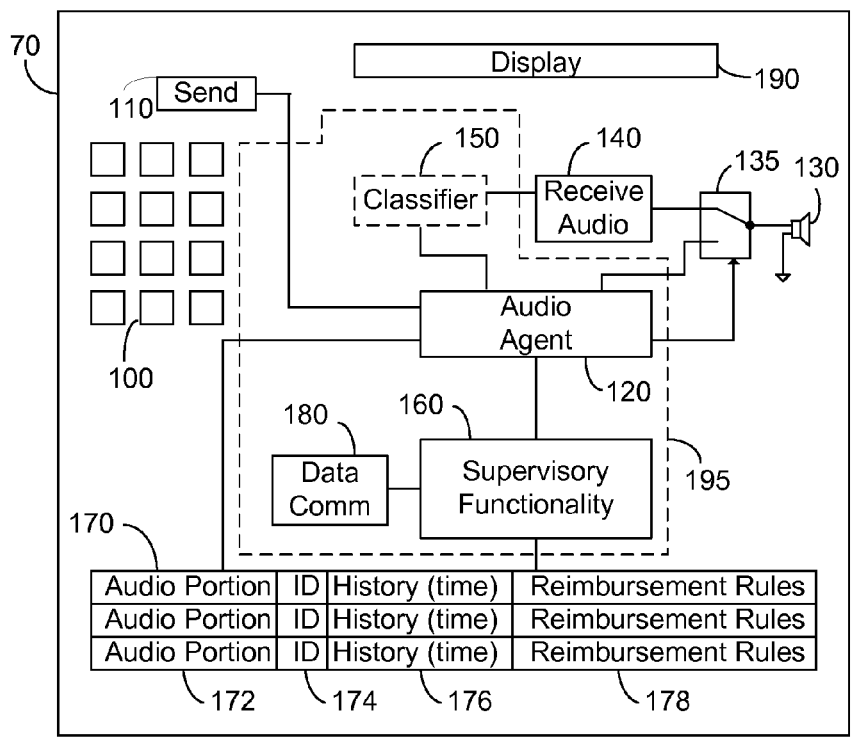
FIG. 2. illustrates a high level schematic diagram of the calling telephone of FIG. 1 providing a controlled audio portion to a caller according to an exemplary embodiment.

FIG. 2 illustrates a high level schematic diagram of an embodiment of calling telephone 70 of FIG. 1 comprising: a keypad 100; a send button 110; an on-board controlled audio agent 120; a speaker 130; an audio switch mechanism 135; a receive audio mechanism 140; an optional call condition classifier 150; a supervisory functionality 160; a memory 170; a data communication module 180; and a display 190. Memory 170 preferably comprises an audio portion storage 172, an identifier storage 174, a history storage 176 and a reimbursement rules storage 178.

In one embodiment the combination of on-board controlled audio agent 120, optional call condition classifier 150, supervisory functionality 160 and data communication module 180 constitutes a telephone agent 195. In another embodiment (not shown), telephone agent 195 is constituted of on-board controlled audio agent 120 in cooperation with optional call condition classifier 35.

Respective connections of on-board controlled audio agent 120 are coupled to send button 110, supervisory functionality 160, audio portion storage 170, the control input of audio switch mechanism 135, a first audio input of audio switch mechanism 135 and optional call condition classifier 150. Supervisory functionality 160 is coupled to audio portion storage 170 and data communication module 180. Receive audio mechanism 140 is connected to a second audio input of audio switch mechanism 135. Speaker 130 is connected to the output of audio switch mechanism 135. In one non-limiting embodiment, at least one of on-board controlled audio agent 120; optional call condition classifier 150; supervisory functionality 160; and data communication module 180 is implemented as a software code providing the respective functionality, the software code being run on a processor of telephone 70.

The above has been described in relation to an implementation comprising a dedicated send button 110, however this is not meant to be limiting in any way. In particular the use of a soft button, or automated dialing software is particularly contemplated. The term send button 110 is thus descriptive of a functionality operative to initiate a phone call and not a particular key.

In operation, audio switch mechanism 135 is operative, responsive to a signal at the control input of audio switch mechanism 135 provided by on-board controlled audio agent 120, to alternately pass the audio output of on-board controlled audio agent 120 to speaker 130 and the audio output receive audio mechanism 140 to speaker 130.

Upon call initiation by a user via keypad 100 and send button 110, on-board controlled audio agent 120 is operative to control audio switch mechanism 135 to connect to the audio output of on-board controlled audio agent 120 to speaker 130. On-board controlled audio agent 120 is further operative, preferably responsive to supervisory functionality 160 to output a selected audio portion from the plurality of audio portions stored in audio portion storage 172 of memory 170 for output at speaker 130. In one embodiment, supervisory functionality 160 is further operative to store history information of the selected audio portion in history portion 176 of memory 170, associated with an identifier of the selected audio portion stored in identifier storage 174, and the length of time the selected audio portion was provided for output at speaker 130. In another embodiment, supervisory functionality 160 is further operative to maintain reimbursement rules associated with each of the audio portions and store the reimbursement rules in reimbursement rules storage 178. In one embodiment, the particular audio portion selected from audio portion storage 172 is selected responsive to the reimbursement rules stored in reimbursement rules storage 178.

The contents of memory 170 is not static, and both the audio portions stored in audio portions storage 172, the respective identifiers store in identifier storage 174 and the reimbursement rules stored in reimbursement rules storage 178 may be changed responsive to a received data via data communication module 180, as will be described further hereinto below.

Optional call condition classifier 150 is operative as described above in relation to optional call condition classifier 35 of FIG. 1, and in one embodiment only one of optional call condition classifier 35 and optional call condition classifier 150 is provided. In the event that optional call condition classifier 35 is provided at the network side, data from optional call condition classifier 35 is provided to on-board controlled audio agent 120 via data communication module 180 and supervisory functionality 160.

Receive audio mechanism 140 receives audio from called telephone 60 or called telephone network 40 and transfers it to optional call condition classifier 150. The received audio is not transferred to speaker 130 because audio switch mechanism 135 is connected to pass audio from on-board controlled audio agent 120. One of optional call condition classifier 35 and optional call condition classifier 150 continuously monitors the condition of the call as the called party is contacted, and classifies the condition of the call as one of awaiting a response, answered and failed. Preferably only upon detection of a human voice response or an answering service response is the call condition determined as answered. In the event that one of optional call condition classifier 35 and optional call condition classifier 150 classifies the condition of the call as awaiting a response, on-board controlled audio agent 120 maintains the output of the selected audio portion at speaker 130. In the event that one of optional call condition classifier 35 and optional call condition classifier 150 classifies the condition of the call as answered, on-board controlled audio agent 120 enables audio switch mechanism 135 to connect receive audio mechanism 140 to speaker 130, thereby outputting received audio of the telephone channel. In the event that one of optional call condition classifier 35 and optional call condition classifier 150 classifies the condition of the call as failed, audio agent 120 disables the selected audio portion, optionally after completing a predetermined minimum section thereof, and a failure message is output at the telephone.

The above has been described in an embodiment in which only an audio portion is sent to speaker 130 until call answer or failure, however this is not meant to be limiting in any way. In another embodiment, additionally at least one of an associated text, an associated image and an associated video portion is further output on display 190 of calling telephone 70. Optionally, a user may respond to one of the audio portion, associated text, associated image and associated video portion by providing an input at keypad 100. In one embodiment the user input is stored and acted upon by supervisory functionality 160 after completion of the telephone call. In one particular embodiment the audio portion represents an advertisement. In one particular further embodiment, the user input at keypad 100 may present an entry to a purchasing system, or may initiate the transmission of a discount or rebate instrument such as a coupon. In another particular embodiment, the user input at keypad 100 may initiate entry into a survey with a concomitant chance reward. Preferably, any such response from the user is further stored in history storage 176.

Optional call classifier 35 and optional call classifier 150 are in one embodiment in accordance with the teaching of one or more of: U.S. Pat. No. 6,041,116 issued Mar. 21, 2000 to Meyers; U.S. Pat. No. 6,385,548 issued May 7, 2002 to Ananthaiyer et al; and U.S. Pat. No. 6,925,166 issued Aug 2, 2005 to Chan, the entire contents of each of which are incorporated herein by reference.

Figure 3A:
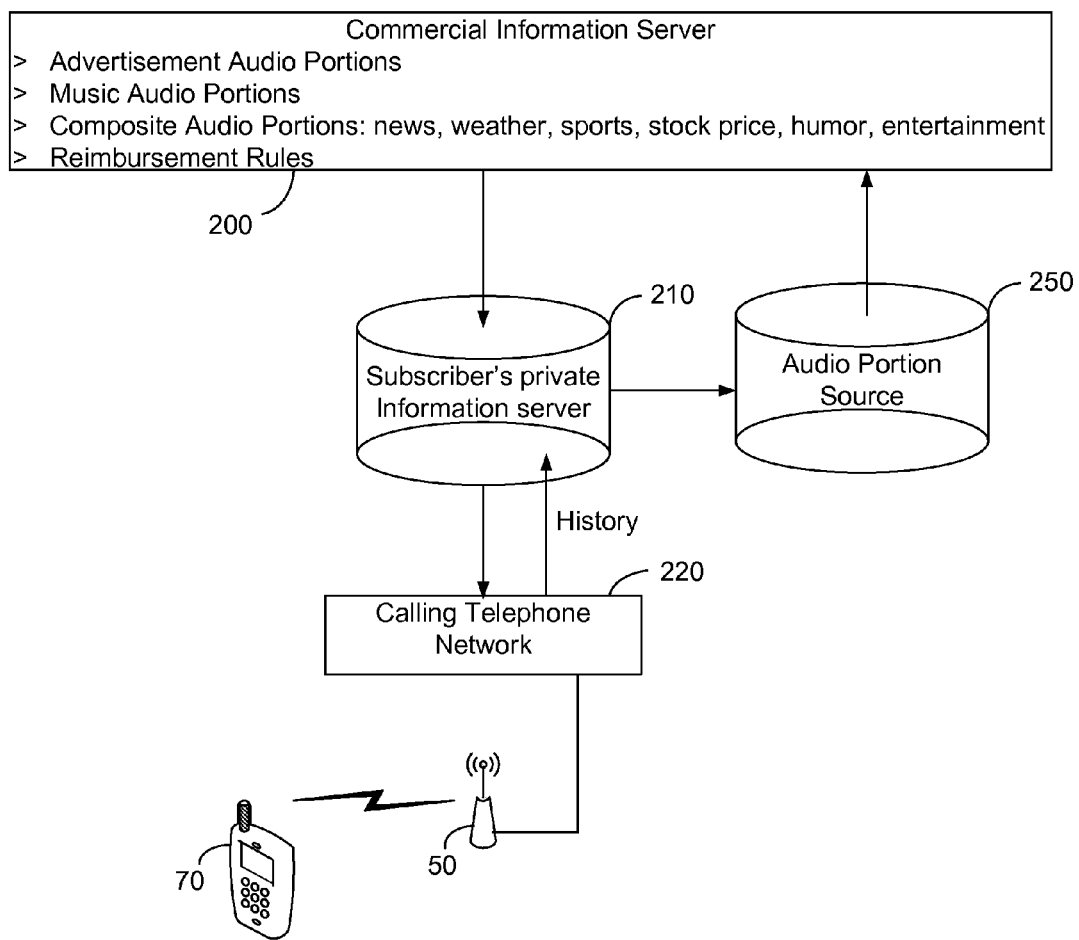
FIG. 3A illustrates a high level schematic diagram of a communication system connecting a subscribed telephone and a commercial information server according to an exemplary embodiment.

FIG. 3A illustrates a high level schematic diagram of a communication system comprising a commercial information server 200, a subscriber's private information server 210, a calling telephone network 220, an audio portion source 250, a cellular antenna 50 and a calling telephone 70. Commercial information server 200 comprises a plurality of audio portions. In one embodiment the plurality of audio portions comprises at least one of advertisements, music and composite information such as news, weather, sports, stock prices, humor and entertainment. Commercial information server 200 further comprises reimbursement rules associated with each of the plurality of audio portions. There is no requirement that the reimbursement rules be static, and in one embodiment commercial information server 200 is further operative to transfer a composite of history information received from each of the supervisory functionalities 160 of the various telephone's 70 to audio portion source 250, and in response a change in reimbursement rules or audio portion may be sent by audio portion source 250 to commercial information server 200.

Subscriber's private information server 210 comprises user descriptive data such as at least one of age, sex, income, job description and preferred hobby. Subscriber's private information server 210 is in communication with commercial information server 200 and via calling telephone network 220 each of the subscribing telephones 70. Calling telephone network 220 is in communication with calling telephone 70 via cellular antenna 50.

In operation, responsive to user descriptive data stored on subscriber's private information server 210, selected audio portions from commercial information server 200 and optional related reimbursement rules are downloaded to telephones 70 whose user descriptive data matches a target profile. In one embodiment, the reimbursement rules are sensitive to certain user descriptive data, and no reimbursement is offered for subscriber's whose user descriptive data stored on subscriber's private information server 210 does not match a desired profile.

In general, the combination of subscriber's private information server 210 and commercial information server 200 functions as a network maintenance and supervision agent to deliver selected audio portions and reimbursement rules consonant with user descriptive data stored on subscriber's private information server 210.

Figure 3B:
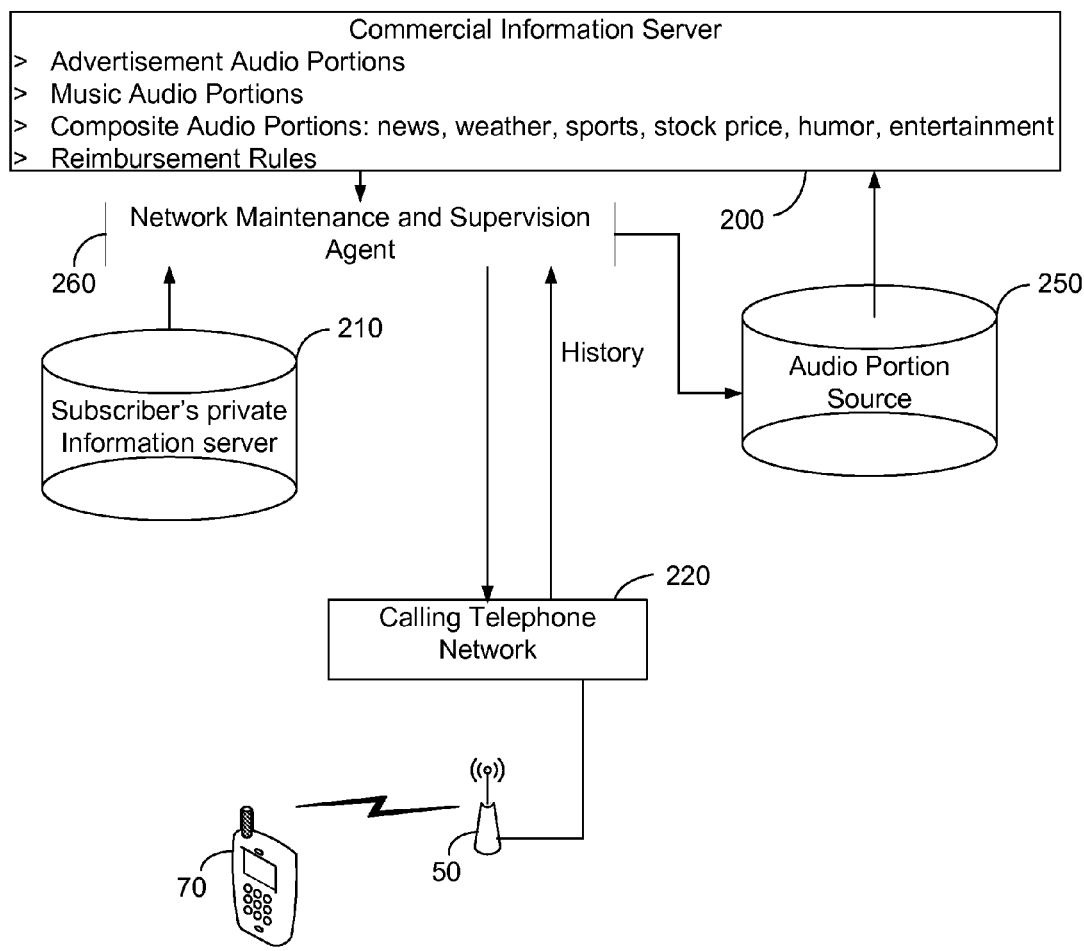
FIG. 3B illustrates a high level schematic diagram of a communication system connecting a subscribed telephone, a network maintenance and supervision agent and a commercial information server according to an exemplary embodiment.

FIG. 3B illustrates a high level schematic diagram of a communication system comprising a commercial information server 200, a subscriber's private information server 210, a calling telephone network 220, an audio portion source 250, a network maintenance and supervision agent 260, a cellular antenna 50 and a calling telephone 70. Commercial information server 200 comprises a plurality of audio portions. In one embodiment the plurality of audio portions comprises at least one of advertisements, music and composite information such as news, weather, sports, stock prices, humor and entertainment. Commercial information server 200 further comprises reimbursement rules associated with each of the plurality of audio portions.

Subscriber's private information server 210 is in communication with network maintenance and supervision agent 260, and is in communication with a subscriber associated with calling telephone 70 via a network such as the Internet (not shown). Network maintenance and supervision agent 260 is in communication with each of commercial information server 200, each calling telephone 70 via calling telephone network 220 and audio portion source 250. Audio portion source 250 is further in communication with commercial information server 200. A single audio portion source 250 is illustrated, however this is not meant to be limiting in any way, and a plurality of independent audio portion sources 250 is specifically contemplated.

In operation, subscriber's private information server 210 comprises user descriptive data, preferably comprising at least one of age, sex, income, job description and preferred hobby for each calling telephone 70 associated with calling telephone network 220 for which a subscription to the service associated with commercial information server 200 has been arranged. There is no requirement that each calling telephone 70 subscribe to the service associated with commercial information server 200. Subscription to the service associated with commercial information server 200 is in one embodiment accomplished via a web page, at which user descriptive data is entered.

Network maintenance and supervision agent 260 is operative to download to each calling telephone 70 associated with calling telephone network 200, for which information is found on subscriber's private information server 210, a plurality of selected audio portions from commercial information server 200, the plurality of audio portions being selected for downloading responsive to the user descriptive data on subscriber's private information server 210. Network maintenance and supervision agent 260 is further operative to download to each calling telephone reimbursement rules associated with each of the downloaded audio portions, the reimbursement rules defining remuneration to the subscriber associated with calling telephone 70. Preferably, the reimbursement rules are further responsive to the user descriptive data on subscriber's private information server 210. In particular, the audio portions selected are preferably those for which user descriptive data matches a target profile. In one embodiment, the reimbursement rules are sensitive to certain user descriptive data, and no reimbursement is offered for subscribers whose user descriptive data stored on subscriber's private information server 210 does not match a desired profile.

Network maintenance and supervision agent 260 is further operative to automatically upload from each calling telephone 70, preferably on a periodic basis, history information associated with each of the downloaded audio portions, as described above in relation to history storage 176 of FIG. 2. In certain embodiments, network maintenance and supervision agent 260 is further operative to consolidate history information from a plurality of calling telephones 70, and provide the consolidated history information to audio portion source 250. In an embodiment in which a plurality of audio portion sources 250 are supplied, the consolidated history information for each audio portion is preferably supplied to the sourcing audio portion source 250.

Audio portion source 250 is operative to upload to commercial information server 200 updated audio portions and/or reimbursement rules. The updated audio portions and/or reimbursement rules may be uploaded on a scheduled basis, or responsive to consolidated history information. In one non-limiting example, in which an uploaded consolidated history comprises information regarding user inputs received, as described above in relation to FIG. 2, audio portion source 250 updates one or more of the audio portions and reimbursement rules stored on commercial information server 200 responsive to information regarding user inputs.

The above has been described in an embodiment in which a consolidated history report is supplied to audio portion source 250, however this is not meant to be limiting in any way. In another embodiment particular information regarding selected subscribers and their associated history is provided to audio portion source 250.

Figure 4:
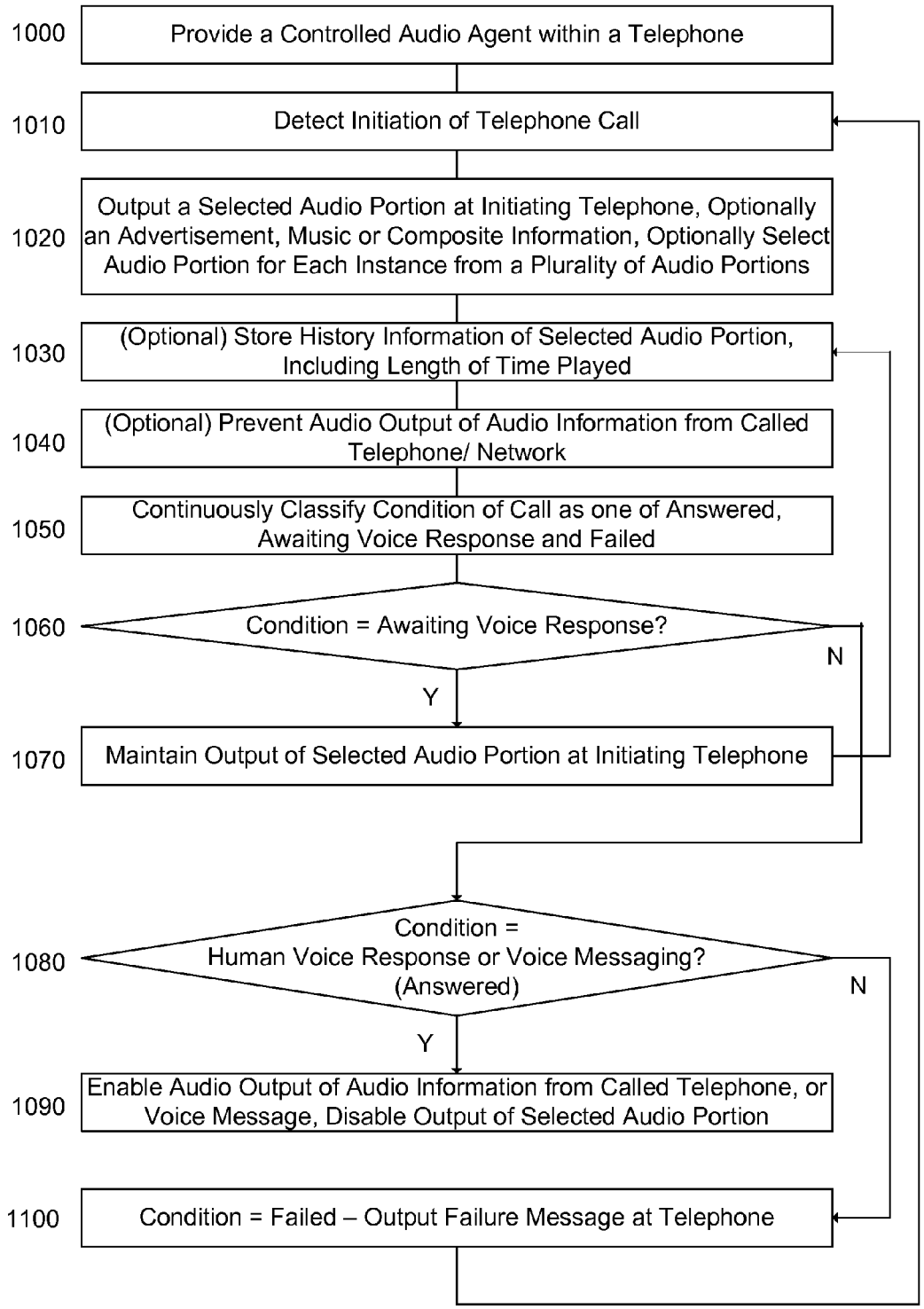
FIG. 4 illustrates a high level flow chart of a method of providing a controlled audio portion to a caller according to an exemplary embodiment.

FIG. 4 illustrates a high level flow chart of a method of providing a controlled audio portion to a caller according to an exemplary embodiment. In stage 1000 a controlled audio agent is provided within a telephone, such as on-board controlled audio agent 120 of FIG. 2. In stage 1010 initiation of a telephone call is detected. In stage 1020 a selected audio portion is output at the initiating telephone. Optionally the selected audio portion is an advertisement, music or composite information, however there is no requirement that all of the audio portions be of the same category. Optionally the selected audio portion for each instance of a call initiation is selected from a plurality of audio portions. In one embodiment, additionally at least one of an associated text, an associated image and an associated video portion is further output on a display of calling telephone. In another embodiment, a user input responsive to the audio portion is stored to be acted upon after completion of the call.

In optional stage 1030 history information of the selected audio portion, including the length of time played, is stored. In optional stage 1040 the output of audio information received from the called telephone or called telephone network is prevented. In stage 1050 the condition of the call is continuously classified as one of answered, awaiting voice response and failed.

In stage 1060 the call condition of stage 1050 is compared to determine if the condition of the call condition is awaiting voice response. In the event that the condition of the call is awaiting voice response, in stage 1070 the output of the selected audio portion at the initiating telephone is maintained and stage 1030, as described above, is performed.

In the event that in stage 1060 the call condition is not awaiting voice response, in stage 1080 the condition of the call is further compared to determine if the call condition is answered, i.e., a human voice or voice messaging has been detected. In the event that the call condition is answered, in stage 1090 the output of audio information from the called telephone or a voice message from the called telephone network or called telephone is enabled, and the output of the selected audio portion is disabled.

In the event that in stage 1080 the condition of the call is not answered, i.e., the condition of the call is failed, in stage 1100 a failure message is output at the calling telephone and stage 1010, as described above, is performed. In one embodiment a text message indicative of a failed call is further displayed. In one embodiment, in the event of a failed call, a predetermined minimum section of the selected audio portion is output prior to outputting the failure message of stage 1100.

Figure 5:
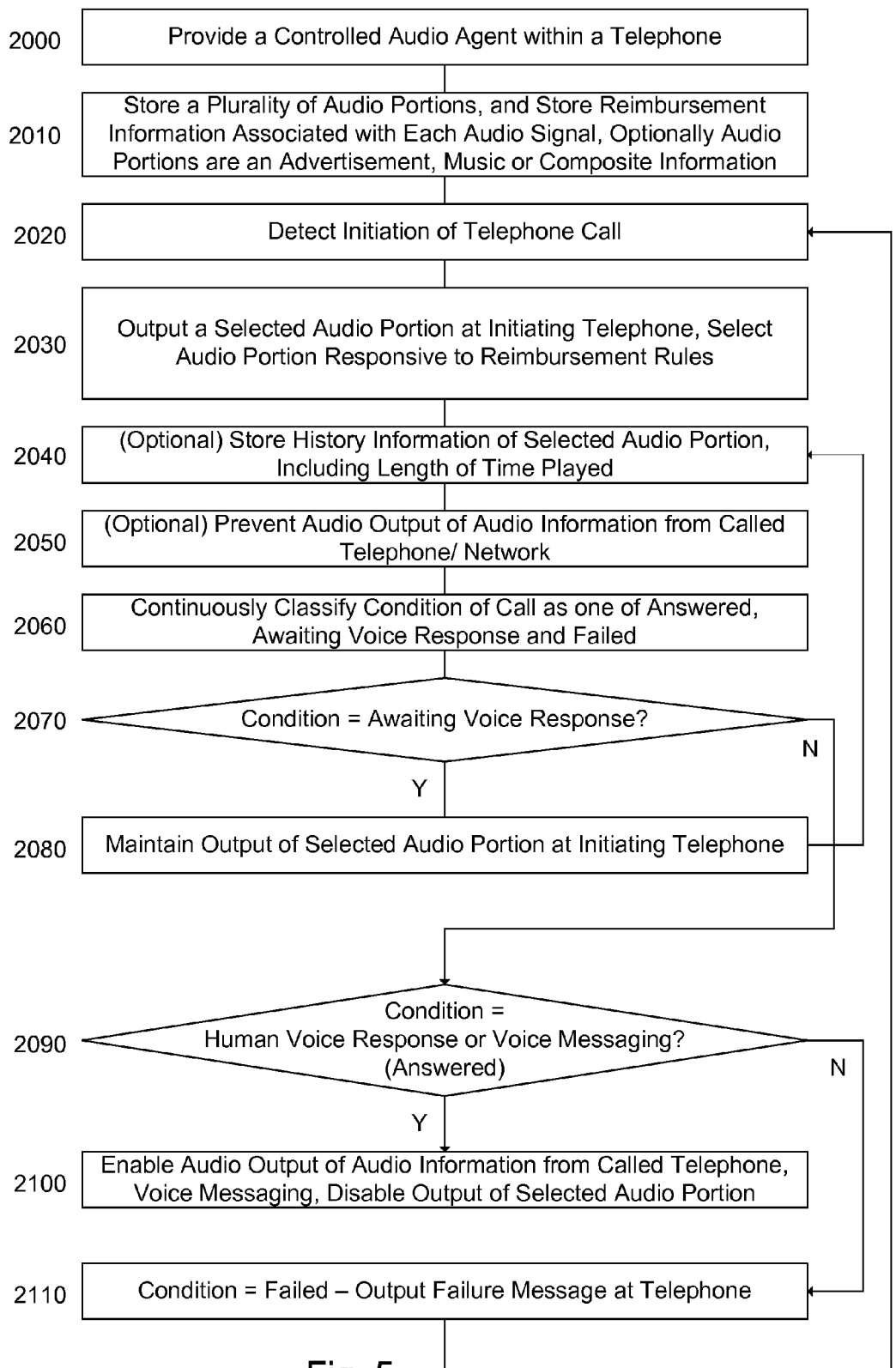
FIG. 5 illustrates a high level flow chart of a method of selecting the provided audio portion according to an exemplary embodiment.

FIG. 5 illustrates a high level flow chart of a method of selecting the provided audio portion according to an exemplary embodiment. In stage 2000 a controlled audio agent is provided within a telephone, such as on-board controlled audio agent 120 of FIG. 2. In stage 2010 a plurality of audio portions and reimbursement information associated with each audio portion is stored. The audio portions preferably comprise one of an advertisement, music and composite information, however there is no requirement that all of the audio portions be of the same category. In stage 2020 initiation of a telephone call is detected. In stage 2030 a selected audio portion is output at the initiating telephone, the selected audio portion being selected responsive to the stored reimbursement rules. Optionally the selected audio portion is an advertisement. In one embodiment, additionally at least one of an associated text, an associated image and an associated video portion is further output on a display of the calling telephone. In another embodiment, a user input responsive to the selected audio portion is stored to be acted upon after completion of the call.

In optional stage 2040 history information of the selected audio portion, including the length of time played, is stored. In one embodiment, the history information further comprises user feedback as described above in relation to FIG. 2. In optional stage 2050 the output of audio information received from the called telephone or called telephone network is prevented. In stage 2060 the condition of the call is continuously classified as one of answered, awaiting voice response and failed.

In stage 2070 the call condition of stage 2060 is compared to determine if the condition of the call condition is awaiting voice response. In the event that the condition of the call is awaiting voice response, in stage 2080 the output of the selected audio portion at the initiating telephone is maintained and stage 2040, as described above, is performed.

In the event that in stage 2070 the call condition is not awaiting voice response, in stage 2090 the condition of the call is further compared to determine if the call condition is answered, i.e., a human voice or voice messaging has been detected. In the event that the call condition is answered, in stage 2100 the output of audio information from the called telephone or a voice message from the called telephone network or called telephone is enabled, and the output of the selected audio portion is disabled.

In the event that in stage 2090 the condition of the call is not answered, i.e., the condition of the call is failed, in stage 2110 a failure message is output at the calling telephone and stage 2020, as described above, is performed. In one embodiment a text message indicative of a failed call is further displayed. In one embodiment, in the event of a failed call, a predetermined minimum section of the selected audio portion is output prior to outputting the failure message of stage 2110.

Figure 6:
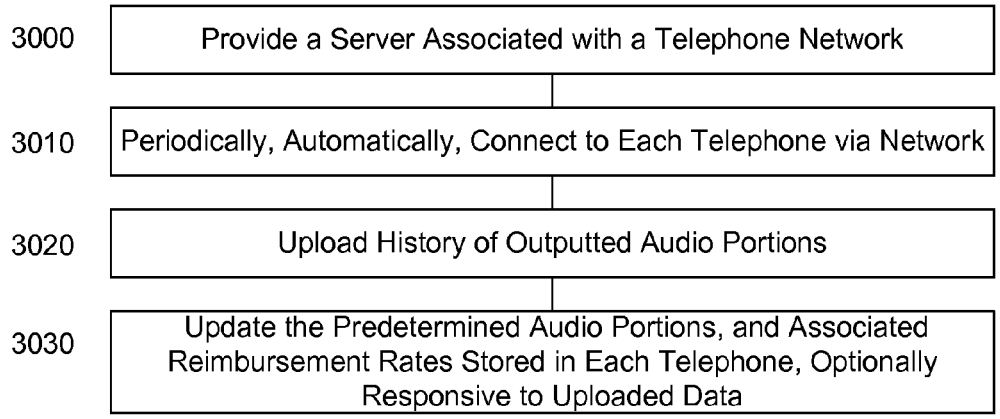
FIG. 6 illustrates a high level flow chart of a method of updating the stored audio portions and associated reimbursement rules according to an exemplary embodiment.

FIG. 6 illustrates a high level flow chart of a method of updating the stored audio portions and associated reimbursement rules according to an exemplary embodiment. In stage 3000 a server is provided, the provided server associated with a telephone network. In one embodiment, the server of stage 3000 comprises a combination of commercial information server 200 and subscriber's private information server 210 of FIG. 3.

In stage 3010 the provided server of stage 3000 connects automatically to each of the telephones in the network via the calling network, preferably on a periodic basis. In another embodiment the provided server connects with telephones in the network responsive to events, such as a certain number of calls made by each of the respective telephones. In stage 3020 the history of the outputted selected audio portions and associated reimbursement rules, such as that stored on history storage 176 of FIG. 2 is uploaded to the server. In stage 3030 the plurality of audio portions and reimbursement rules are updated for each telephone, preferably by downloading revised information for storage in audio portion storage 172 and reimbursement rules storage 178. Optionally, the updated information is responsive to the data uploaded in stage 3020.

Figure 7:
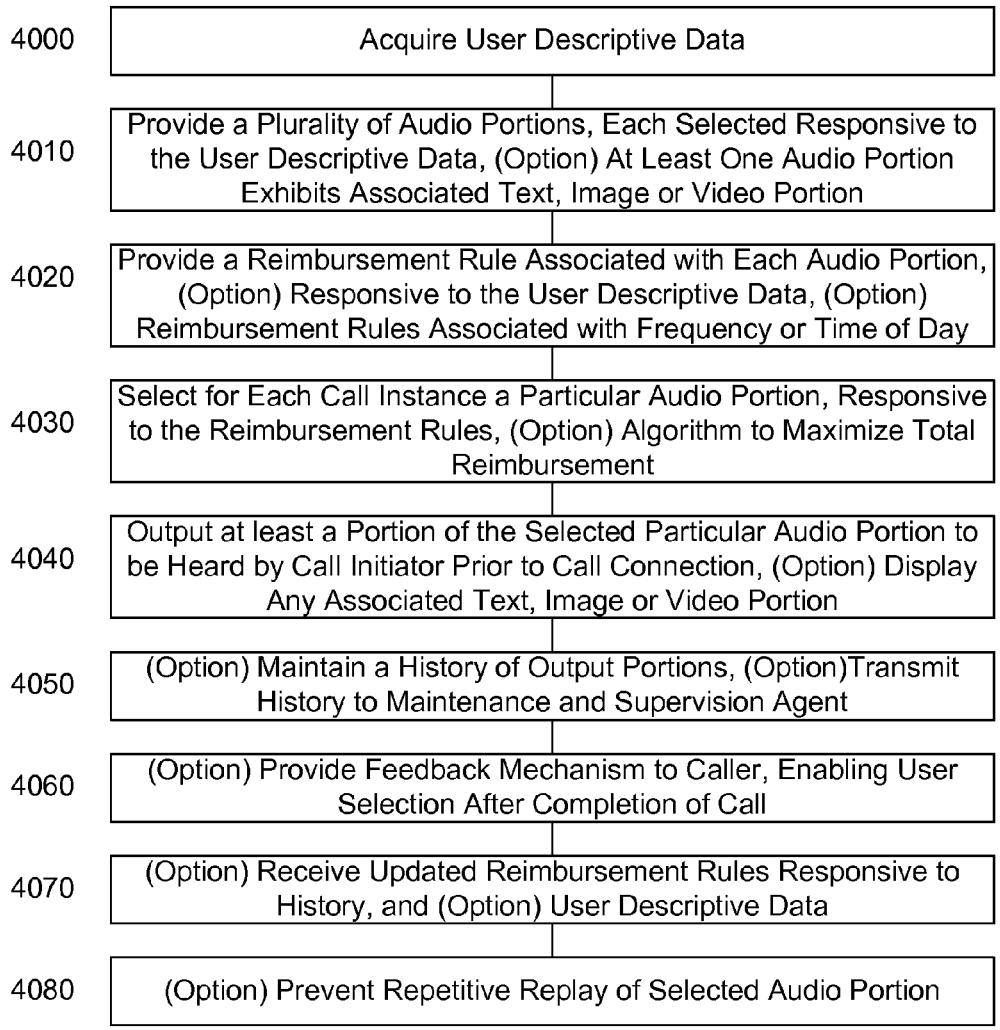
FIG. 7 illustrates a high level flow chart of a method of network maintenance and supervision of an on-board controlled audio agent according to an exemplary embodiment.

FIG. 7 illustrates a high level flow chart of a method of network maintenance and supervision of an on-board controlled audio agent according to an exemplary embodiment. In one particular embodiment, the method of FIG. 7 is associated with the communication system of FIG. 3B. In stage 4000, user descriptive data for a user is acquired. Preferably, the user descriptive data is acquired associated with a particular telephone.

In stage 4010, a plurality of audio portions is provided to each of the telephones, each of the plurality of audio portions being selected responsive to the user descriptive data of stage 4000. The audio portions preferably comprise one of an advertisement, music and composite information, however there is no requirement that all of the audio portions be of the same category. Optionally, at least one of the audio portions has further associated therewith an associated text, image or video portion, or a combination thereof, for display on the telephone.

In stage 4020, a reimbursement rule associated with each of provided audio portions of stage 4010 is provided to the telephone. Optionally, the reimbursement rules are responsive to the user descriptive data of stage 4000. In particular, for each audio portion a particular reimbursement rule is provided. There is no requirement that the reimbursement rule be of a single function, and complex reimbursement rules are particularly anticipated. In one non-limiting example, reimbursement rules are associated with one or more of frequency of output of the associated audio portion and time of day of output of the associated audio portion.

In stage 4030, for each call instance of each telephone, where the telephone is the call initiator, a particular audio portion of the provided plurality of audio portions of stage 4010 is selected for output to be heard by the call initiator prior to call connection. The audio portion is selected responsive to the provided reimbursement rules of stage 4020. Optionally, the audio portion is selected in accordance with an algorithm to maximize total reimbursement. Thus, the audio portions are selected so as to maximize reimbursement to the user.

In stage 4040, at least a portion of the selected audio portion is output to the user. In particular, upon call initiation the selected audio portion is promptly initiated, and as described above in relation to each of FIGS. 2, 4 and 5, audio output from the called telephone or called telephone network is blocked until the call is answered. The length of the portion of the selected audio portion output is in one embodiment a function of the time elapsed from call initiation until a voice response from the called telephone is detected. In the event of a failure of the call to be completed, in one embodiment a predetermined length of the selected audio portion is output. Optionally, concurrent with the output of the selected audio portion, any associated text, image or video portion is output on a display of the telephone.

In optional stage 4050, a history of the output audio portion is maintained, preferably comprising the length of the audio portion which was output. In one embodiment, the history further comprises a complete time history including times of day in which the audio portion was output, and number of times the audio portion was output. Optionally, the history information is further transmitted automatically to a network maintenance and supervisory agent.

In optional stage 4060, a feedback mechanism is further provided for at least some of the audio portions, enabling the call initiator to respond to the audio portion, and/or the optional associated text, image or video portion. Any user input is preferably stored with the history information of stage 4050. In one embodiment, the feedback mechanism enables connection of the user to a service after completion of the call being currently initiated. In another embodiment, the feedback mechanism provides for an immediate order placement, without requiring further connection.

In optional stage 4070, updated reimbursement rules are received responsive to the transmitted history of stage 4050. Optionally, the updated reimbursement rules are further responsive to the used descriptive data of stage 4000.

In optional stage 4080, the algorithm for selection of audio portions is modified so as to prevent repetitive replay of particular audio portions. Thus, in one non-limiting example in which the selection algorithm is operative to maximize total reimbursement, and a particular audio portion exhibits a reimbursement rate greater than all other audio portions, stage 4080 is operative to prevent repetitive replay of the single audio portion exhibiting the greater reimbursement rate. Stage 4080 is not limited to barring repetitive reimbursement, and in one embodiment stage 4080 is operative to ensure that a mix of audio portions is used as an additional factor in the selection of audio portions of stage 4030.

Thus, the present embodiments enable an on-board controlled audio agent provided with a plurality of audio portions to be output to an initiating caller until call connection with a voice response. In certain embodiments, associated with each of the audio portions is at least one reimbursement rule, and the controlled audio agent is operative to select the audio portion responsive to the reimbursement rules. Preferably the controlled audio agent is operative to select the audio portion so as to maximize total reimbursement responsive to the reimbursement rules.

In certain embodiments the controlled audio agent maintains a history of audio portions output to the caller, and uploads the history to a network maintenance and supervision agent. The network maintenance and supervision agent is operative to regularly provide updated reimbursement rules and audio portions responsive to the uploaded history.

Figure 8A:
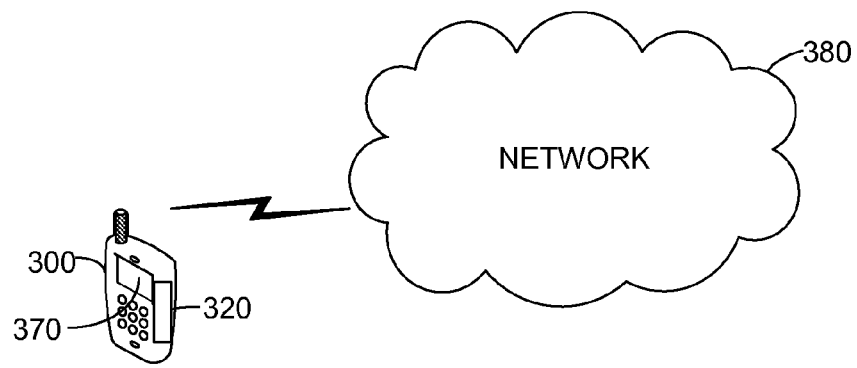
FIG. 8A illustrates a high level schematic diagram of a telephone comprising a first embodiment of an apparatus for controlled advertisement display.
Figure 8B:
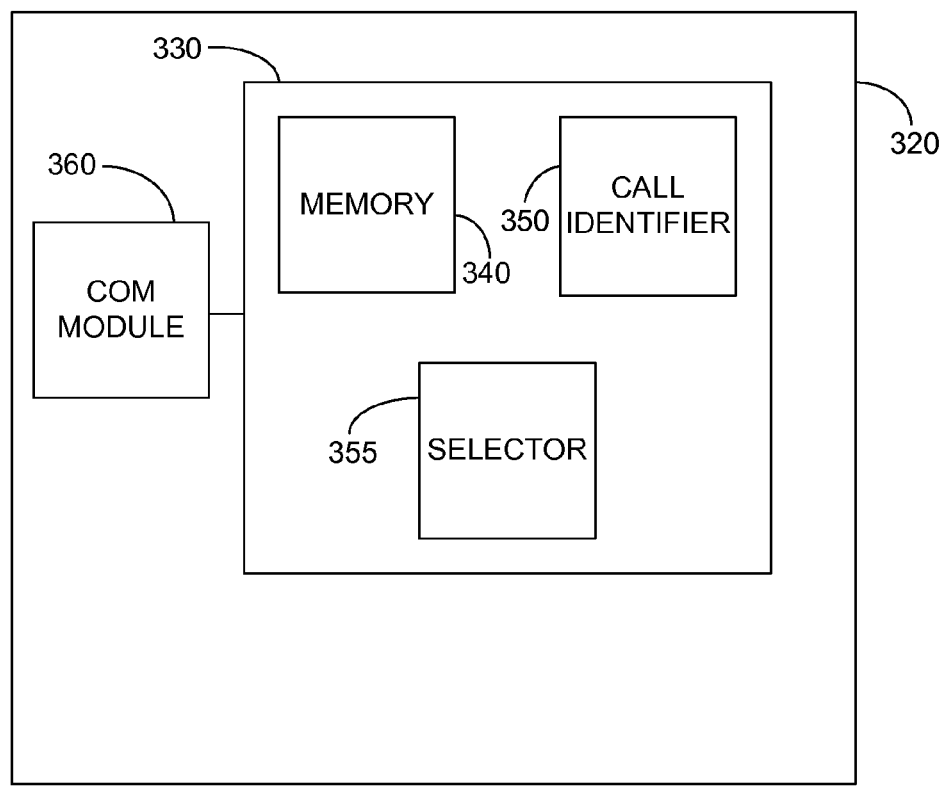
FIG. 8B illustrates a high level block diagram of the apparatus of FIG. 8A.

FIG. 8A illustrates a high level schematic diagram of a telephone 300 comprising an apparatus for controlled advertisement display 320; and FIG. 8B illustrates a high level block diagram of apparatus for controlled advertisement display 320, FIGS. 8A-8B being described together. Apparatus for controlled advertisement display 320 comprises: a controlled display agent 330, exhibiting a memory 340, a call identifier 350 and a selector 355; and a data communication module 360 in communication with controlled display agent 330. Display agent 330 is further in communication with a display 370 of telephone 300 and data communication module 360 is further in communication with a network 380. Each of display agent 330 and data communication module 360 may be constituted of special purpose hardware, or may be a general computing device programmed to provide the functionality described herein. The instructions for the general computing device may be stored on memory 340 without limitation. In one embodiment, memory 340 is a general purpose memory of telephone 300. In another embodiment, each of display agent 330 and data communication module 360 is a particular portion of a computer readable medium containing instructions for implementing the functions described below, the instructions arranged to be executed by a processor of telephone 300. In one embodiment, network 380 is one of: a cellular network; a telephony network; and the internet.

In operation, data communication module 360 is arranged to download a plurality of display portions from network 380 and store the downloaded display portions on memory 340 of display agent 330. Each of the plurality of downloaded display portions is arranged to illustrate an advertisement different than advertisements illustrated by other downloaded display portions. In one embodiment, each display portion is arranged to illustrate a unique advertisement. In another embodiment, two or more of the downloaded display portions may be arranged to illustrate similar advertisements. In one embodiment, each of the illustrated advertisements of the downloaded display portions is associated with a particular offering for sale and/or a particular provider, such as a service provider or a merchandise provider. In one embodiment, as will be described below, the display portions are downloaded from a commercial information server in communication with network 380, the display portion sever having stored thereon a plurality of display portions associated with a plurality of providers. In another embodiment, the display portions are downloaded from a particular provider.

Call identifier 350 of display agent 330 is arranged to identify a call instance on telephone 300. In one embodiment, call identifier 350 is arranged to identify one of: a call initiation by telephone 300; an incoming call to telephone 300; an active call between telephone 300 and another telephone; and a call termination on telephone 300. In one embodiment, call identifier 350 is arranged to receive an indication of the call condition from a network in communication with data communication module 60. In another embodiment, call identifier 350 is arranged to identify the call condition responsive to analysis of data on telephone 300. Selector 355 of display agent 330 is arranged to select a particular one of the downloaded display portions stored on memory 340. In one embodiment, as will be described below, selector 355 is arranged to select the particular display portion responsive to a plurality of rules. In one embodiment, selector 355 is arranged to select the particular display portion responsive to an identified call instance on telephone 300.

Display agent 330 is arranged to display the selected display portion on display 370 of telephone 300, such that the advertisement illustrated by the displayed display portion is displayed on display 370. In one embodiment, the selected display portion is displayed responsive to a call instance termination on telephone 300. In another embodiment, the selected display portion is displayed responsive to one of: a call instance initiation by telephone 300; an incoming call to telephone 300; and an active call between telephone 300 and another telephone. In one embodiment, selector 355 is arranged to select from the plurality of downloaded display portions, such that a plurality of the downloaded display portions are displayed on display 370 for a predetermined number of call instance terminations. In one further embodiment, selector 355 is arranged to select, for each call instance, a display portion illustrating a different advertisement than the advertisement illustrated by a previously selected display portion. In one embodiment as will be described below, after one or more display portions are displayed, the displayed display portions are removed from memory 340 and data communication module 360 is arranged to download display portions to replace the removed display portions.

Figure 9A:
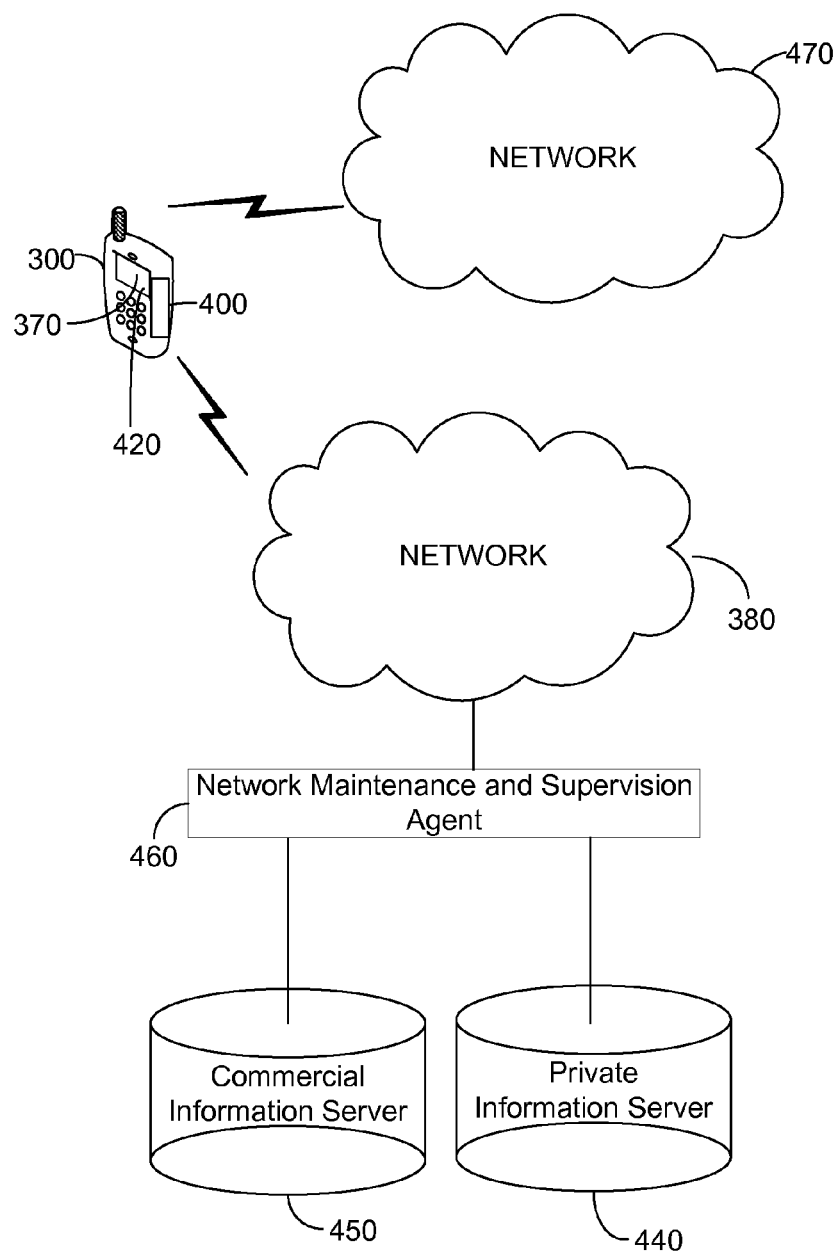
FIG. 9A illustrates a high level schematic diagram of a telephone comprising a second embodiment of an apparatus for controlled advertisement display.
Figure 9B:
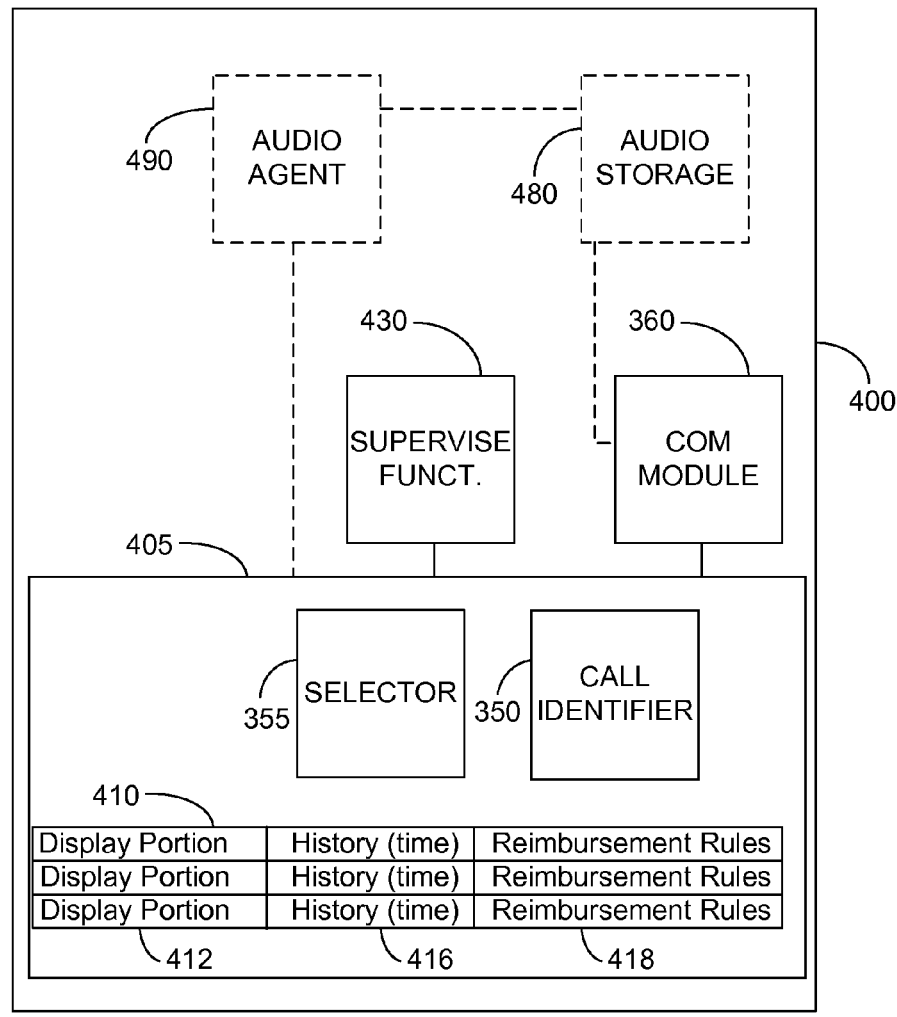
FIG. 9B illustrates a high level block diagram of the apparatus of FIG. 9A.

FIG. 9A illustrates a high level schematic diagram of a telephone 300 associated with an apparatus for controlled advertisement display 400 comprising a controlled audio agent 405 associated with telephone 300; and FIG. 9B illustrates a high level block diagram of apparatus for controlled advertisement display 400, FIGS. 9A-9B being described together. Apparatus for controlled advertisement display 400 comprises: a controlled display agent 405 exhibiting a memory 410, a call identifier 350 and a selector 355; a data communication module 360 in communication with controlled display agent 405; a user input device 420; and a supervisory functionality 430. Further illustrated is a private information server 440 in communication with network 380; and a commercial information sever 450 in communication with network 380. In one embodiment, memory 410 comprises: a display storage portion 412; a history storage 416; and a rules storage 418. Private information server 440 comprises user descriptive data such as at least one of age, sex, income, job description and preferred hobby, as described above in relation to private information server 210. Commercial information server 450 comprises a plurality of display portions. As described above in relation to FIGS. 8A-8B, each display portion is arranged to illustrate an advertisement. In one embodiment, each of the illustrated advertisements is associated with a particular offering for sale and/or a particular provider, such as a service provider or a merchandise provider. In one embodiment commercial information server 450 comprises display portions arranged to illustrate advertisements associated with a plurality of providers. In another embodiment, commercial information server 450 comprises display portions arranged to illustrate advertisements associated with a single provider. In one embodiment, as described above in relation to commercial information server 200, commercial information server 450 further comprises rules associated with each of the plurality of audio portions, in one further embodiment the rules being reimbursement rules. As described above, there is no requirement that the rules be static, and in one embodiment commercial information server 450 is further arranged to receive a composite of history information received from each of the supervisory functionalities 430 of various telephones 300 in communication therewith, and in response the reimbursement rules or display portions may be changed.

Each of controlled display agent 405, data communication module 360 and supervisory functionality 430 may be constituted of special purpose hardware, or may be a general computing device programmed to provide the functionality described herein. The instructions for the general computing device may be stored on memory 410 without limitation. In one embodiment, memory 410 is a general purpose memory of telephone 300. In one embodiment, user input device 420 is a key pad of telephone 300. In another embodiment, each of display agent 405, data communication module 360 and supervisory functionality 430 is a particular portion of a computer readable medium containing instructions for implementing the functions described below, the instructions arranged to be executed by a processor of telephone 300. In another embodiment, as will be described below, user input device 420 is one or more particular locations on display 370, which is provided as a touch screen. In another embodiment, user input device 420 is arranged to receive voice commands from a microphone of telephone 300 (not shown).

Display agent 405 is further in communication with a display 370 of telephone 300 and data communication module 360 is further in communication with a network 380 and a network 470, the connections not shown for the sake of simplicity. In one embodiment, network 470 is one of: a cellular network; a telephony network; and the internet. In another embodiment (not shown), network 470 is embodied within network 380. Supervisory functionality 430 is in communication with user input device 420 and with data communication module 360, the connection with user input device not shown for the sake of simplicity.

In one embodiment, apparatus for controlled advertisement display 400 further comprises: an optional audio portion storage 480; and an optional controlled audio agent 490, associated with optional audio portion storage 480. In one embodiment, optional audio portion storage 480 and optional controlled audio agent 490 are on-board telephone 300, as described above in relation to audio agent 120 and audio portion storage 170 of FIG. 2. In such an embodiment, a plurality of audio portions are downloaded from commercial information server 450, as described above in relation to commercial server 200. In another embodiment (not shown), optional audio portion storage 480 and optional controlled audio agent 490 are external of telephone 300, optional controlled audio agent 490 in communication with telephone 300 via network 380. In either embodiment, optional controlled audio agent 490 is in communication with optional audio portion storage 480. In one embodiment, optional controlled audio agent 490 is further in communication with controlled display agent 405 and optional audio portion storage 480 is further in communication with communication module 360. As described above in relation to FIGS. 1-7, optional audio portion storage 480 has stored thereon a plurality of audio portions, and in one embodiment each audio portion exhibits an audio advertisement. Each of optional controlled audio agent 490 and optional audio portion storage 480 may be constituted of special purpose hardware, or may be a general computing device programmed to provide the functionality described herein. The instructions for the general computing device may be stored on memory 410 without limitation.

In operation, responsive to user descriptive data stored on subscriber's private information server 440, network maintenance and supervision agent 460 is arranged to select display portions from commercial information server 450 and optional related reimbursement rules, and download the selected data to a telephone 300 whose user descriptive data matches a target profile, as described above in relation to network maintenance and supervision agent 260 of FIG. 3B. In one embodiment, the reimbursement rules are sensitive to certain user descriptive data, and no reimbursement is offered for subscriber's whose user descriptive data stored on subscriber's private information server 440 does not match a desired profile.

Network maintenance and supervision agent 460 is further arranged to automatically upload from each telephone 300, preferably on a periodic basis, history information associated with each of the downloaded display portions and stored on history storage 416, as will be described below. In certain embodiments, network maintenance and supervision agent 460 is further arranged to consolidate history information from a plurality of telephones 300, and provide the consolidated history information to commercial information server 200, as described above in relation to FIG. 3B. In another embodiment, history information associated with activities of the user of telephone 300 are uploaded to network maintenance and supervision agent 460 and display portions are downloaded responsive to the activities of the user, as described below.

As described above in relation to FIGS. 8A-8B, the display portions and optional reimbursement rules are downloaded via data communication module 60 and stored on memory 410. In one embodiment, the display portions are stored on display storage portion 412 and the optional reimbursement rules are stored on rules storage 418.

Call identifier 350 of display agent 405 is arranged to identify a call instance on telephone 300, as described above. As described above, selector 355 of display agent 405 is arranged to select a particular one of the downloaded display portions stored on memory 410. In one embodiment, selector 355 is arranged to select the particular display portion responsive to one or more reimbursement rules stored on rules storage 418. In one embodiment, selector 355 is arranged to select the particular display portion responsive to an identified call instance on telephone 300. In one further embodiment, selector 355 is arranged to select the particular display portion responsive to an identified call instance termination on telephone 300. In one embodiment, the display portion is selected responsive to the detected type of call status, i.e. call initiation, call termination, or answering of call, the selection further being responsive to the properties of the display portion. For example, a display portion being selected responsive to a call initiation may comprise a different display length and/or different content than a display portion selected responsive to a call termination or responsive to an answering of a call.

In another embodiment, selector 355 is arranged to select the particular display portion responsive to a previously selected display portion being displayed on display 70. In particular, as will be described below, information regarding display portions which are displayed on display 70 is stored on history storage portion 416 of memory 410 and selector 355 is arranged to select a particular display portion responsive to the stored history information and responsive to the rules stored on rules storage portion 418 of memory 410.

As described above in relation to display agent 330, display agent 405 is arranged to display the selected display portion on display 370 of telephone 300, such that the advertisement illustrated by the displayed display portion is displayed on display 370. As described above, in one embodiment selector 55 is arranged to select from the plurality of downloaded display portions, such that a plurality of the downloaded display portions are displayed on display 370 for a predetermined number of call instance terminations. In one further embodiment, selector 355 is arranged to select, for each call instance, a display portion illustrating a different advertisement than the advertisement illustrated by a previously selected display portion. In one embodiment, the displayed display portion illustrates a request for a user input. In one further embodiment, the requested user input is one of: a user gesture on a keypad of telephone 300; a user gesture on a particular portion of display 370; and a voice command. In one embodiment, a display portion arranged to illustrate an advertisement is displayed on display 370 and subsequent to the display of the advertisement another display portion is displayed on display 370 illustrating a request for a user input associated with the previously displayed advertisement.

In one embodiment, a plurality of requests for user inputs are displayed on display 370, each request for a user input corresponding to a different mode of communication with the provider of the displayed advertisement over network 470. In one non-limiting embodiment, a request for a user inputs comprises one of: a request to connect to a web site of the provider; a request to initiate a call to the provider; a request to receive a call from the provider; a request to receive information from the provider via short messaging service (SMS); a request to receive information from the provider via e-mail; and a request to download data associated with the advertised provider, or product, such as a coupon or an application arranged to run on telephone 300.

In one embodiment, as described above, a user can press one or more keys on a keypad of telephone 300 responsive to the request for a user input. In another embodiment, as described above, a user can vocally enter a voice command in the microphone of telephone 300 responsive to the request for a user input. In another embodiment, as described above, display 370 is a touch screen and a user can touch a portion of display 370 corresponding to the particular request for user input. Responsive to a user input on user input device 420, supervisory functionality 430, in cooperation with data communication module 360, is arranged to initiate a data connection to an address of network 470, the address responsive to the received user input and the displayed request for user input. In particular, in the embodiment where the request for user input is a request for a data connection with the provider of the advertisement, such as a telephone call, SMS, e-mail, connection to a web site, or data download, supervisory functionality 430 is arranged to initiate the data connection with the network address of the provider and perform the act indicated by the request for user input.

In another embodiment, the request for a user input comprises a request for an audio advertisement and responsive to a request for an audio advertisement optional controlled audio agent 490 is arranged to output an audio portion associated with the advertisement illustrated by the displayed display portion is output such that audio portion is heard by the user of telephone 300.

In one embodiment, after one or more display portions are displayed, the displayed display portions are removed from memory 40 and data communication module 60 is arranged to download display portions to replace the removed display portions. As described above, in one embodiment each display portion stored on storage portion 412 has associated therewith one or more rules stored on rules storage 418. In one embodiment, the rules comprise information regarding the amount of time a display portion should be stored on telephone 300 before being updated, and displayed display portions are replaced by additional display portions responsive to the amount of time the display portion has been stored on telephone 300. In another embodiment, replacement display portions are downloaded responsive to the time of day. In one embodiment, as described above, information regarding the displayed display portion is stored on history storage 416, such as the time of day at which the display occurred and an identifier of the displayed display portion and replacement display portions are downloaded responsive to the stored information. In one embodiment, supervisory functionality is arranged to store information about activities of the user of telephone 300 on history storage 416, such as access to particular web sites or phone calls initiated to certain numbers, and the replacement display portions are downloaded responsive to the stored information.

In the embodiment where optional controlled audio agent 490 is provided, as described above in relation to FIGS. 1-7, a particular one of the audio portions stored on optional audio portion storage 480 is selected by optional controlled audio agent 490, the selected audio portion containing an audio advertisement. When a user of telephone 300 initiates a call an audio portion is output by optional controlled audio agent 490 such that at least a portion of said output audio portion is heard by the user prior to call connection. As described above, controlled display agent 405 is arranged to select a display portion to be displayed on display 370, in one embodiment the selection is responsive to the output audio portion such that the displayed advertisement corresponds to the advertisement of the output audio portion. In one embodiment, the selected display portion is displayed on display 370 contemporaneously with the output of the audio portion.

Figure 10:
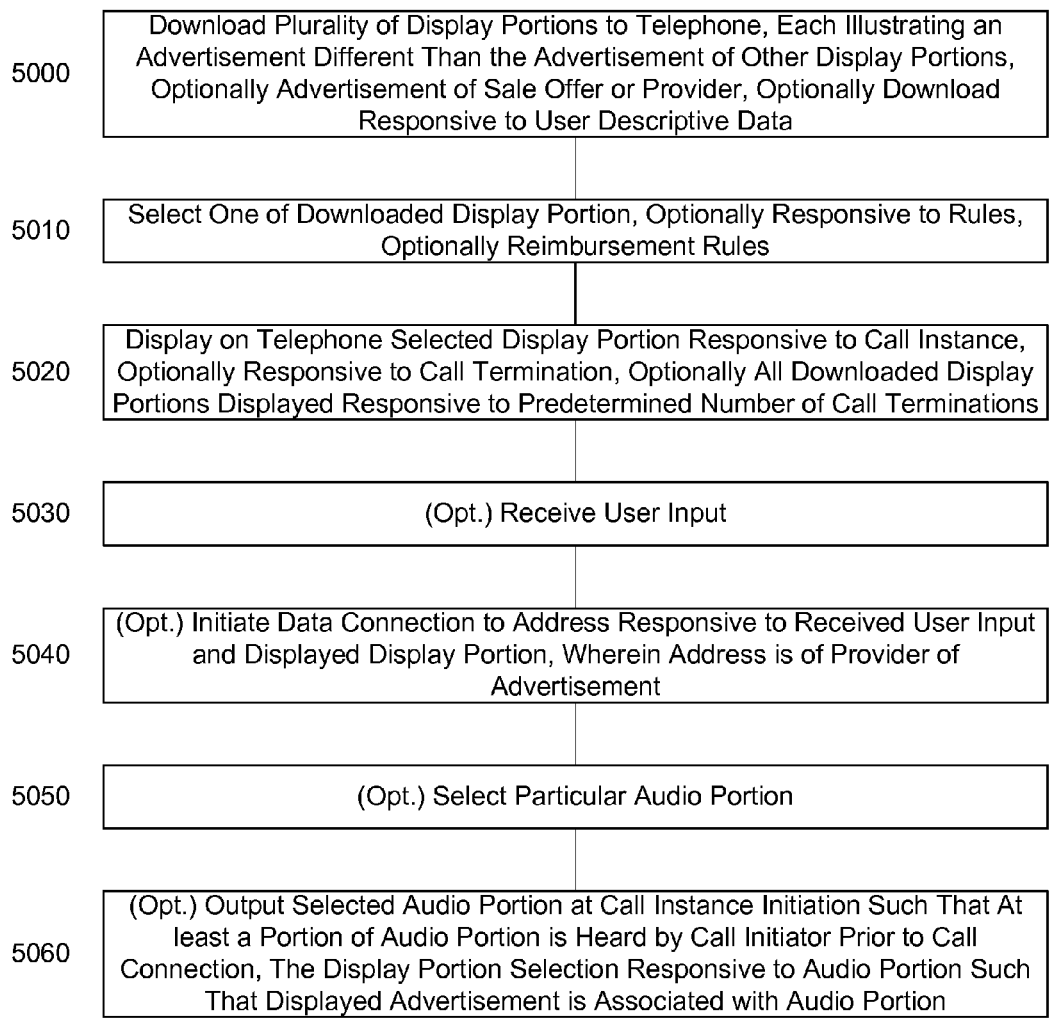
FIG. 10 illustrates a high level flow chart of a method of controlled advertisement display on a telephone.

FIG. 10 illustrates a high level flow chart of a method of controlled advertisement display on a telephone. In stage 5000, a plurality of display portions are downloaded to the telephone, each display portion illustrating an advertisement different than the advertisement of the other downloaded display portions. In one embodiment, each of the illustrated advertisements is associated with one of: a particular offering for sale; and a particular provider, such as a service provider or a merchandise provider. In another embodiment, the display portions are downloaded responsive to descriptive data of the user of the telephone, the descriptive data optionally stored on a private information server.

In stage 5010, a particular one of the downloaded display portions of stage 5000 are selected. In one embodiment, the selection is responsive to one or more rules associated with the downloaded display portions, optionally the rules comprising reimbursement rules. In stage 5020, the selected display portion of stage 5010 is displayed on the telephone responsive to a call instance on the telephone. In one embodiment, the selected display portion is displayed responsive to a call instance termination. In another embodiment, all of the downloaded display portions of stage 5000 are arranged to be displayed responsive to a predetermined number of call instance terminations.

In optional stage 5030, a user input is received. In one embodiment, the user input is responsive to a request for a user input displayed on the display of the telephone. Optionally, the displayed display portion of stage 5020 comprises the request for user input. In optional stage 5040, a data connection is initiated to a network address responsive to the received user input of stage 5030 and responsive to the displayed display portion of stage 5020. As described above, the displayed display portion illustrates an advertisement, the data connection being to a network address of the provider of the advertisement.

In optional stage 5050, a particular one of a plurality of audio portions are selected. In one embodiment, the plurality of audio portions are downloaded to the telephone and the particular audio portion is selected from the plurality of downloaded audio portions. In one embodiment, each audio portion comprises an audio advertisement. In optional stage 5060, the selected audio portion of stage 5050 is output at a call instance initiation, initiated by the telephone, such that at least a portion of the output audio portion is heard by a call initiator prior to call connection. In one embodiment, the selecting of a display portion of stage 5010 is responsive to the output audio portion such that the advertisement illustrated by the selected display portion of stage 5010 is associated with the advertisement of the output audio portion.

Figure 11:
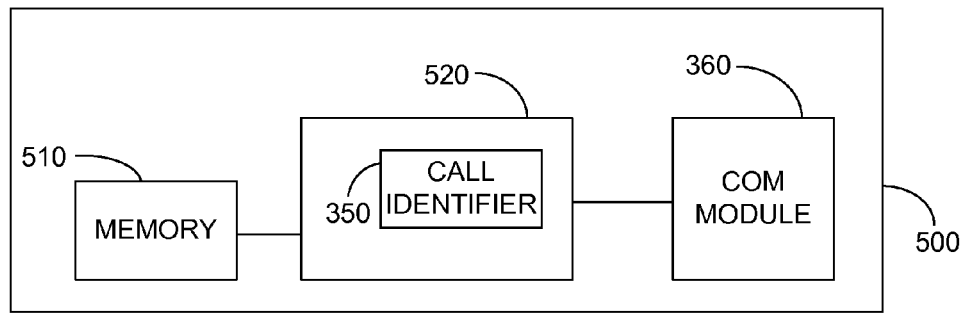
FIG. 11 illustrates a high level block diagram of a third embodiment of an apparatus for controlled advertisement display.

FIG. 11 illustrates a high level block diagram of an apparatus for controlled advertisement display 500. Apparatus for controlled advertisement display 500 comprises: a memory 510; a controlled display agent 520, in communication with memory 510 and exhibiting a call identifier 350; and a data communication module 360 in communication with controlled display agent 520. Apparatus for controlled advertisement display 500 is situated within telephone 300, as described above in relation to apparatus for controlled advertisement display 320 of FIG. 8A. Display agent 520 is further in communication with display 370 of telephone 300 and data communication module 360 is arranged to be in communication with network 380, as described above in relation to FIG. 8A. As described above, each of display agent 520 and data communication module 360 may be constituted of special purpose hardware, or may be a general computing device programmed to provide the functionality described herein. The instructions for the general computing device may be stored on memory 510 without limitation. In one embodiment, memory 510 is a general purpose memory of telephone 300. In another embodiment, each of display agent 520 and data communication module 360 is a particular portion of a computer readable medium containing instructions for implementing the functions described below, the instructions arranged to be executed by a processor of telephone 300. In one embodiment, as described above, network 380 is one of: a cellular network; a telephony network; and the internet.

In operation, in one embodiment display agent 520 periodically determines if a display portion is stored on memory 510. In the event display agent 520 determines that no display portion is stored on memory 510, data communication module 360 is arranged to download a display portion from network 380 and store the downloaded display portion on memory 510. The downloaded display portion is arranged to illustrate an advertisement. In one embodiment, the illustrated advertisement is associated with a particular offering for sale and/or a particular provider, such as a service provider or a merchandise provider. In one embodiment, as described above, the display portion is downloaded from a commercial information server 450 in communication with network 380, the display portion sever having stored thereon a plurality of display portions associated with a plurality of providers. In another embodiment, the display portion is downloaded from a particular provider. In one embodiment, as described above in relation to FIG. 9A, the display portion is downloaded to telephone 300 by network maintenance and supervision agent 460 which is in communication with commercial information server 450 and a private information server 440. As described above, in one embodiment private information server 440 exhibits user descriptive data associated with a user of telephone 300 and commercial information server 450 exhibits a plurality of display portions and rules associated with the plurality of display portions, the display portion downloaded responsive to at least one of the user descriptive data and the associated rules. In one embodiment, the associated rules are reimbursement rules. In one embodiment, display agent 520 is arranged to delete any display portion stored on memory 510 responsive to the download of a new display portion.

In one embodiment, network maintenance and supervision agent 460 is arranged to add to the display portion time to live (TTL) information, indicating the time when the display portion expires. In one embodiment, the TTL information is determined responsive to user descriptive data stored on private information server 440 and/or reimbursement rules stored on commercial information server 450. In another embodiment, each display portion stored on commercial information server 450 comprises TTL information, optionally provided by a provider associated with the particular display portion.

As described above, call identifier 350 of display agent 520 is arranged to identify a call instance on telephone 300 and in one embodiment, call identifier 350 is arranged to identify one of: a call initiation by telephone 300; an incoming call to telephone 300; an active call between telephone 300 and another telephone; and a call termination on telephone 300. Display agent 520 is arranged to display the downloaded display portion on display 370 of telephone 300, such that the advertisement illustrated by the displayed display portion is displayed on display 370. In one embodiment, the display portion is displayed responsive to a call instance termination on telephone 300, detected by call identifier 350. In another embodiment, the selected display portion is displayed responsive to one of: a call instance initiation by telephone 300; an incoming call to telephone 300; and an active call between telephone 300 and another telephone. In the embodiment where the downloaded display portion comprises TTL information, the display portion is displayed only if the display portion hasn't expired. In one embodiment, subsequent to displaying the display portion on display 370, or subsequent to the expiration of the display portion responsive to the TTL information, display agent 520 deletes the display portion from memory 510.

Subsequent to displaying of the downloaded display portion on display 370, or subsequent to the expiration of the display portion responsive to the TTL information, display agent 520 determines if communication module 360 is in communication with network 380. In the event display agent 520 determines that communication module 360 is in communication with network 380, display agent 520 initiates a request, via data communication module 360, for a new display portion. In one embodiment, the request is transferred via network 380 to network maintenance and supervision agent 460. Responsive to the request a new display portion is downloaded to telephone 300, as described above.

In the event display agent 520 determines that communication module 360 is not in communication with network 380, for example in the embodiment where network 380 is the internet and there is no internet connection, display agent 520 creates a time stamp of the current time and stores the time stamp in memory 510. In one embodiment, display agent 520 is arranged to periodically determine if a time stamp is stored in memory 510. In the event display agent 520 determines that a time stamp is stored in memory 510, display agent 520 determines if telephone 300 is in communication with network 380, as described above.

In the event display agent 520 determines that communication module 360 is in communication with network 380, display agent 520 transmits to network 380, via communication module 360, the time stamp stored on memory 510. In one embodiment, a request for a new display portion is further transmitted to network 380. In another embodiment, the time stamp is transmitted to network maintenance and supervision agent 460. Network maintenance and supervision agent 460 is arranged to download a new display portion to telephone 300, responsive to the received time stamp. In one embodiment, network maintenance and supervision agent 460 compares the received time stamp to TTL information associated with the display portion previously downloaded to telephone 300. In the event that the received time stamp corresponds to the TTL information, network maintenance and supervision agent 460 concludes that the display portion previously downloaded to telephone 300 has expired and was not displayed on telephone 300. In the event the received time stamp does not correspond to the TTL information, network maintenance and supervision agent 460 concludes that the display portion previously downloaded to telephone 300 has been displayed on telephone 300. In one embodiment, network maintenance and supervision agent 460 stores the concluded information on commercial information server 450. In another embodiment, network maintenance and supervision agent 460 is arranged to select a new display portion to download to telephone 300 responsive to the concluded information. For example, in the event a display portion is selected responsive to reimbursement rules, as described above, information indicating whether a particular display portion was or was not displayed on telephone 300 will impact the selection of the new display portion. In one embodiment, subsequent to transmitting the time stamp to network 380, display agent 520 is arranged to delete the time stamp from memory 510.

In another embodiment, display agent 520 is arranged to periodically determine if communication module 360 is in communication with network 380. In the event display agent 520 determines that communication module 360 is in communication with network 380, display agent 520 is further arranged to determine if a time stamp is stored on memory 510. In the event display agent 520 determines that a time stamp is stored on memory 510, the time stamp is transmitted to network 380, as described above.

Thus, when the stored display portion is displayed or expires and there is no communication between telephone 300 and network 380, a time stamp is created. When communication is established between telephone 300 and network 380, the time stamp is transmitted to network 380, the transmitted time stamp allowing network maintenance and supervision agent 460 to determine if the display portion was, or was not, displayed. As described above, in one embodiment a request for a new display portion accompanies the transmitted time stamp. During the period when no communication is established between telephone 300 and network 380, the stored time stamp is not altered. Therefore, when communication is established, network 380 will receive a time stamp indicating the time in which the downloaded display portion was displayed, or the downloaded display portion expired. In the event no time stamp is stored on memory 510, no request for a new display portion is transmitted to network 380.

Figure 12A:
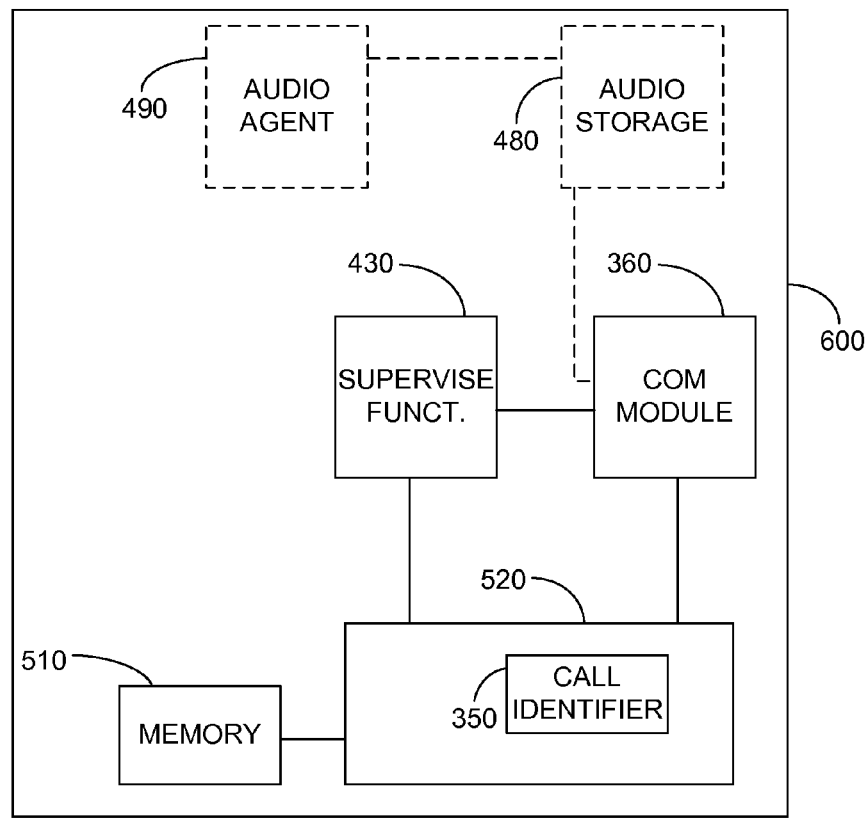
FIG. 12A illustrates a high level block diagram of a fourth embodiment of an apparatus for controlled advertisement display.
Figure 12B:
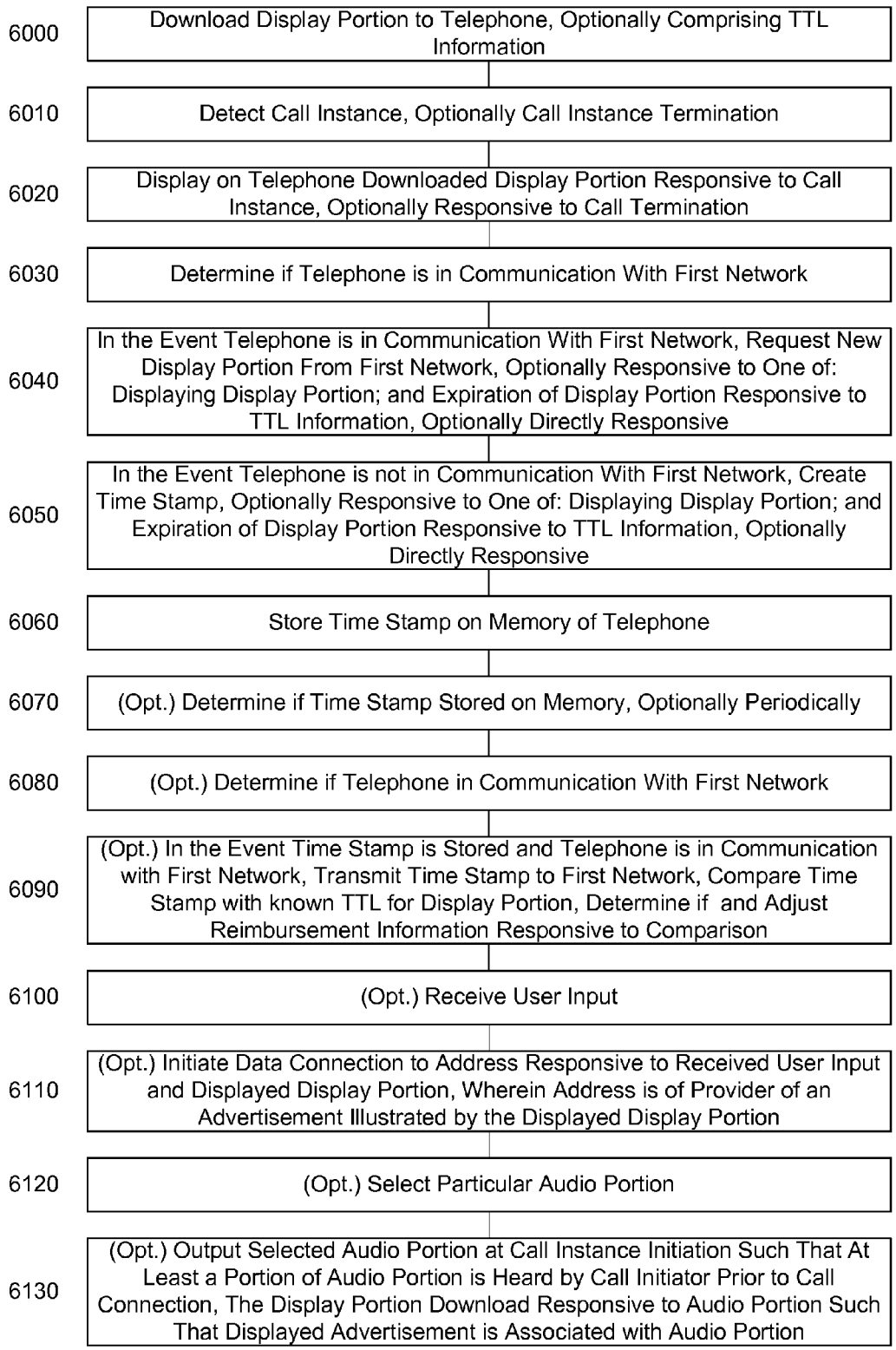
FIG. 12B illustrates a high level flow chart of a method of operation of the apparatus of FIG. 12A.

FIG. 12A illustrates a high level block diagram of an apparatus for controlled advertisement display 600; and FIG. 12B illustrates a high level low chart of the method of operation of apparatus for controlled advertisement display 600, the Figs. being described together. Apparatus for controlled advertisement display 600 is in all respects similar to apparatus for controlled advertisement display 500 of FIG. 11 and further comprises: a supervisory functionality 430; an optional audio portion storage 480; and an optional audio agent 490. Optional audio portion storage 480 is in communication with communication module 360 and optional audio agent 490 is in communication with optional audio portion storage 480. As described above in relation to FIGS. 9A-9B, supervisory functionality 430 is in communication with communication module 360, user input device 420 and display agent 520. Communication module 360 is further arranged to be in communication with a second network 470, as described above in relation to FIG. 9A.

As described above, in one embodiment optional audio portion storage 480 and optional controlled audio agent 490 are on-board telephone 300. In such an embodiment, a plurality of audio portions are downloaded from commercial information server 450, as described above in relation to commercial server 200. In another embodiment (not shown), optional audio portion storage 480 and optional controlled audio agent 490 are external of telephone 300, optional controlled audio agent 490 in communication with telephone 300 via network 380. In either embodiment, optional controlled audio agent 490 is in communication with optional audio portion storage 480. As described above in relation to FIGS. 1-7, optional audio portion storage 480 has stored thereon a plurality of audio portions, and in one embodiment each audio portion exhibits an audio advertisement.

In operation, in stage 6000, a display portion is downloaded via communication module 360 and stored on memory 510, as described above in relation to FIG. 11. As described above, in one embodiment the downloaded display portion comprises TTL information. In one embodiment, a time stamp is created at the moment of download of the display portion, the time stamp stored on network maintenance and supervision agent 460. In stage 6010, call identifier 350 of display agent 520 is arranged to detect a call instance on telephone 300, as described above. In one embodiment, call identifier 350 is arranged to detect a call instance termination. In stage 6020, display agent 520 is arranged to display the downloaded display portion of stage 6000 on display 370 of telephone 300, responsive to the detected call instance, and optionally the detected call instance termination, of stage 6010. In stage 6030, display agent 520 is arranged to determine if telephone 300 is in communication with first network 380, via communication module 360.

In stage 6040, in the event that in stage 6030 display agent 520 determines that telephone 300 is in communication with network 380, display agent 520 is arranged to initiate a request to network 380, via communication module 360, for a new display portion, as described above. Optionally, as described above, the request for a new display portion is transmitted responsive to one of: displaying of the downloaded display portion of stage 6020; and the expiration of the downloaded display portion of stage 6000, responsive to the associated TTL information. Further optionally, the request for a new display portion is transmitted directly responsive to one of: displaying of the downloaded display portion of stage 6020; and the expiration of the downloaded display portion of stage 6000, responsive to the associated TTL information, i.e. the request for a new display portion is transmitted substantially solely responsive to one of the above actions.

In stage 6050, in the event that in stage 6030 display agent 520 determines that telephone 300 is not in communication with network 380, display agent 520 is arranged to create a time stamp with the current time. Optionally, as described above, the creation of a time stamp is performed responsive to one of: displaying of the downloaded display portion of stage 6020; and the expiration of the downloaded display portion of stage 6000, responsive to the associated TTL information. Further optionally, the creation of a time stamp is performed directly responsive to one of: displaying of the downloaded display portion of stage 6020; and the expiration of the downloaded display portion of stage 6000, responsive to the associated TTL information. In stage 6060, in the event a time stamp was created in stage 6050, the created time stamp is stored on memory 510.

In optional stage 6070, as described above, display agent 520 is arranged to determine if a time stamp is stored on memory 510, optionally the determination being performed periodically. In optional stage 6080, as described above, display agent 520 is arranged to determine if telephone 300 is in communication with network 380. In one embodiment, stage 6080 is performed only in the event display agent 520 determines in optional stage 6070 that a time stamp is stored on memory 510. In another embodiment, optional stages 6070 and 6080 are reversed and optional stage 6070 is performed only in the event display agent 520 determines in optional stage 6080 that telephone 300 is in communication with network 380.

In optional stage 6090, in the event display agent 520 determines in optional stage 6070 that a time stamp is stored on memory 510 and determines that telephone 300 is in communication with network 380, display agent 520 is arranged to transmit the stored time stamp to first network 380, as described above. In one embodiment, network maintenance and supervision agent 460 determines if the display portion was, or was not, displayed by comparing the received time stamp with the TTL associated with the previously downloaded display portion and with a time stamp indicating the time of download of the previously downloaded display portion. In the event the difference in time between the received time stamp and the time stamp indicating the time of download is equal to the TTL, network maintenance and supervision agent 460 determines that the display portion expired and was not displayed. In the event the difference in time between the received time stamp and the time stamp indicating the time of download is not equal to the TTL, network maintenance and supervision agent 460 determines that the display portion was displayed. In one embodiment, a new display portion is downloaded to telephone 300, as described above in relation to stage 6000, the new display portion selected responsive to the determination that the downloaded display portion was displayed or expired. In another embodiment, reimbursement information associated with the user of telephone 300 is adjusted responsive to the determination that the downloaded display portion was displayed or expired. In one embodiment, a provider associated with the downloaded display portion is debited responsive to the determination that the downloaded display portion was displayed or expired.

In optional stage 6100, a user input is received at user input device 420. As described above in relation to FIGS. 9A-9B, in one embodiment the user input is entered responsive to a request for user input illustrated by the displayed display portion of stage 6020. In optional stage 6110, supervisory functionality 430 is arranged to initiate a data connection to an address of network 470 responsive to the received user input of optional stage 6100 and responsive to the displayed display portion of stage 6020, the address of network 470 being the address of the provider of the advertisement illustrated by the displayed display portion of stage 6020.

In optional stage 6120, optional audio agent 490 is arranged to select a particular audio portion from the plurality of audio portions stored on optional audio portion storage 480. As described above, in one embodiment the particular audio portion is selected responsive to a plurality of rules, in one embodiment the plurality of rules being reimbursement rules. In optional stage 6130, optional audio agent 490 is arranged to output the selected audio portion of stage 6120 at a call instance initiation such that at least a portion of the output audio portion is heard by the call initiator prior to call connection with a different telephone. Optionally, the downloaded display portion of stage 6000 is associated with the selected audio portion of optional stage 6120, such that the advertisement illustrated by the displayed display portion of stage 6020 corresponds to the audio advertisement of the output audio portion.

Figure 13A:
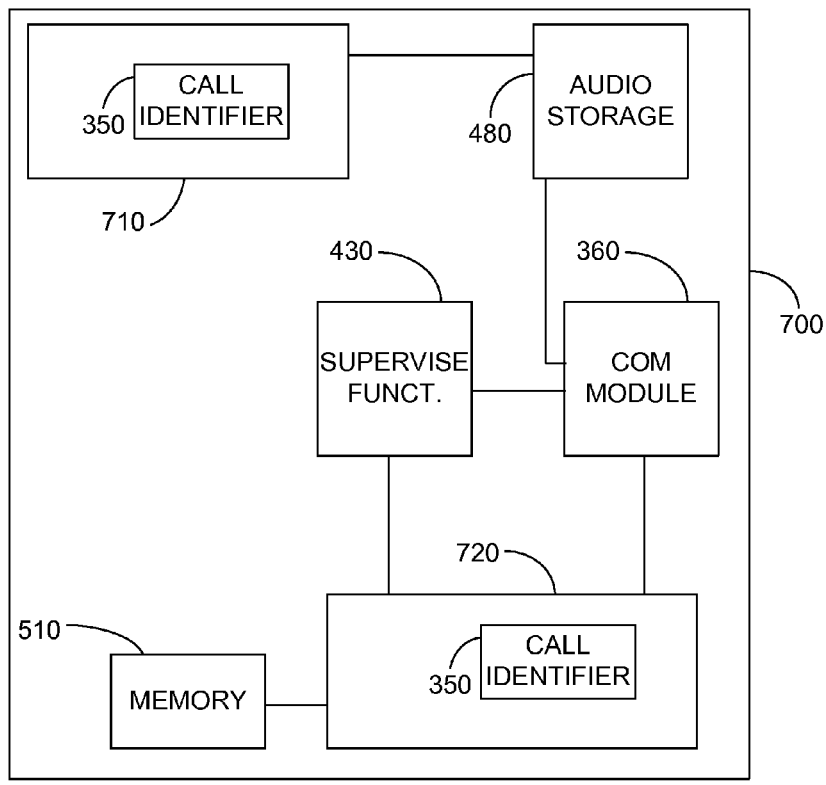
FIG. 13A illustrates a high level block diagram of an apparatus for controlled advertisement display.
Figure 13B:
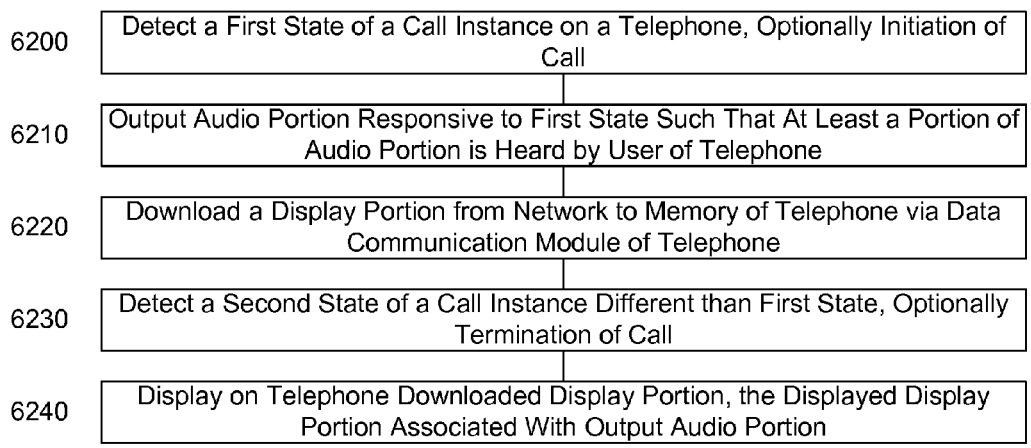
FIG. 13B illustrates a high level low chart of the method of operation of apparatus for controlled advertisement display of FIG. 13A.

FIG. 13A illustrates a high level block diagram of an apparatus for controlled advertisement display 700; and FIG. 13B illustrates a high level low chart of the method of operation of apparatus for controlled advertisement display 700, the Figs. being described together. Apparatus for controlled advertisement display 700 is in all respects similar to apparatus for controlled advertisement display 600 of FIG. 12A, with the exception that audio portion storage 480 is provided as non-optional, controlled audio agent 490 is replaced with controlled audio agent 710 which comprises a first call identifier 350 and display agent 520 is replaced with display agent 720 which comprises a second call identifier 350.

As described above, in one embodiment audio portion storage 480 and controlled audio agent 710 are on-board telephone 300. In such an embodiment, a plurality of audio portions are downloaded from commercial information server 450, as described above in relation to commercial server 200. In another embodiment (not shown), audio portion storage 480 and controlled audio agent 710 are external of telephone 300, controlled audio agent 710 in communication with telephone 300 via network 380. In either embodiment, controlled audio agent 710 is in communication with audio portion storage 480. As described above in relation to FIGS. 1-7, audio portion storage 480 has stored thereon a plurality of audio portions, and in one embodiment each audio portion exhibits an audio advertisement. Each of controlled audio agent 710 and controlled display agent 720 may be constituted of special purpose hardware, or may be a general computing device programmed to provide the functionality described herein. The instructions for the general computing device may be stored on memory 510 without limitation.

In operation, in stage 6200, first call identifier 350 of controlled audio agent 710 is arranged to detect a first state of a call instance on telephone 300. In one embodiment, the first state is an initiation of a telephone call on telephone 300. In stage 6210, responsive to the detected first state of the call instance, controlled audio agent 710 is arranged to select an audio portion from audio portions storage 480 and output the selected audio portion such that at least a portion of the output audio portion is heard by a user of telephone 300, as described above in relation to FIGS. 1-7. In the embodiment where the first state is an initiation of a telephone call, controlled audio agent 710 is arranged to output the selected audio portion such that at least a portion of the output audio portion is heard by the call initiator prior to call connection.

In stage 6220, controlled display agent 720 is arranged to download a display portion via communication module 360 and store the downloaded display portion on memory 510, as described above in relation to FIG. 11. In one embodiment, a plurality of display portions are downloaded and stored on memory 510. In stage 6230, second call identifier 350 of controlled display agent 720 is arranged to detect a second state of a call instance on telephone 300, the second state different than the first state of stage 6200. In one embodiment, the second state is a termination of the telephone call on telephone 300. In stage 6240, responsive to the detected second state of stage 6230, the downloaded display portion of stage 6220 is displayed on display 370 of telephone 300. In the embodiment where a plurality of display portions are downloaded by controlled display agent 720, controlled display agent 720 selects a particular display portion to be displayed, the selected particular display portion being associated with the output audio portion of stage 6210. In one embodiment, the selected display portion is arranged to illustrate an advertisement and the output audio portion of stage 6210 comprises an audio advertisement, the advertisement of the display portion and the advertisement of the audio portion associated with each other. In one embodiment, where a single display portion is downloaded to telephone 300, as described above in relation to FIGS. 12A-12B, the single display portion is selected by network maintenance and supervision agent 460 such that the downloaded display portion of stage 6220 is associated with the output audio portion of stage 6210. In another embodiment, where a single display portion is downloaded to telephone 300, the output audio portion of stage 6210 is selected such that the audio portion is associated with the downloaded display portion of stage 6220.

In one embodiment, as described above in relation to FIGS. 11-12B, the displayed display portion of stage 6240 illustrates at least one request for a user input and supervisory functionality 430 is arranged to initiate a data connection to an address of network 470 responsive to a user input.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

I claim:

1. An apparatus for controlled display on a telephone, the telephone comprising a memory and a data communication module arranged to be in communication with a first network, the apparatus comprising a controlled display agent on-board the telephone, said controlled display agent in communication with the memory and the data communication module, said controlled display agent arranged to:
   download a display portion from the first network to the memory, via the data communication module;
   detect a call instance;
   display on the telephone said downloaded display portion responsive to said detected call instance;
   determine if the data communication module is in communication with the first network;
   in the event said display agent determines that the data communication module is in communication with the first network, request, via the data communication module, a new display portion from the first network; and
   in the event said display agent determines that the data communication module is not in communication with the first network,
      create a time stamp, and
      store said created time stamp on the memory.

2. The apparatus of claim 1, wherein said downloaded display portion comprises time to live information, and
   wherein said request for a new display portion and said time stamp creation is responsive to one of:
      said displaying of said downloaded display portion; and
      expiration of said downloaded display portion responsive to the time to live information.

3. The apparatus of claim 1, wherein said downloaded display portion comprises time to live information, and
   wherein said request for a new display portion and said time stamp creation is directly responsive to one of:
      said displaying of said downloaded display portion; and
      expiration of said downloaded display portion responsive to the time to live information.

4. The apparatus of claim 1, wherein said controlled display agent is further arranged to detect a call instance termination, and
   wherein said displaying of said downloaded display portion is responsive to said detected call instance termination.

5. The apparatus of claim 1, wherein the telephone further comprises a user input device arranged to receive a user input,
   wherein the apparatus further comprises a supervisory functionality in communication with the user input device and said display agent,
   wherein said supervisory functionality is arranged to:
      receive a user input via the user input device; and
      initiate a data connection to an address of a second network via the data communication module, the address responsive to said received user input and said displayed display portion,
   wherein said downloaded display portion is arranged to illustrate an advertisement associated with a particular provider, and
   wherein the address is associated with the particular provider of the advertisement illustrated by said displayed display portion.

6. The apparatus of claim 1, further comprising a controlled audio agent, said controlled audio agent associated with the telephone and in communication with an audio portion storage exhibiting an audio portion,
   said controlled audio portion arranged to output said audio portion at a call instance initiation, initiated by the telephone, such that at least a portion of said output audio portion is heard by a call initiator prior to call connection,
   wherein said displayed downloaded display portion is associated with said output audio portion.

7. The apparatus of claim 1, wherein said controlled display agent is further arranged to:
   determine if a time stamp is stored on the memory;
   determine if the data communication module is in communication with the first network; and
   in the event said controlled display agent determines that a time stamp is stored on said memory and determines that the data communication module is in communication with the first network, transmit to the first network, via the data communication module, said stored time stamp.

8. The apparatus of claim 1, further comprising:
   a display portion storage arranged to have stored thereon a plurality of available display portions, each associated with time to live information, said downloaded display portion being selected from said plurality of available display portions; and
   a network maintenance and supervision agent in communication with the first network and with said display portion storage,
   wherein said controlled display agent is further arranged to transmit to the first network, via the data communication module, said stored time stamp, and
   wherein said network maintenance and supervision agent is arranged to:
      receive said transmitted time stamp;
      compare said received time stamp with time to live information associated with said downloaded display portion; and
      responsive to said comparison, determine if said downloaded display portion was displayed on the telephone.

9. The apparatus of claim 8, wherein each of said plurality of available display portions are associated with a particular provider, and
   wherein responsive to said determination said network maintenance and supervision agent is arranged to debit the provider associated with said downloaded display portion.

10. A method for controlled display on a telephone, the method comprising:
    downloading a display portion from a first network to the telephone;
    detecting a call instance;
    displaying on the telephone said downloaded display portion responsive to said detected call instance;
    determining if the telephone is in communication with the first network;
    in the event the telephone is in communication with the first network, requesting a new display portion from the first network; and in the event the telephone is not in communication with the first network,
 creating a time stamp, and
 storing said created time stamp on a memory of the telephone.

11. The method of claim 10, wherein said downloaded display portion comprises time to live information, and
 wherein said requesting of a new display portion and said creating a time stamp is responsive to one of:
  said displaying of said downloaded display portion; and
  expiration of said downloaded display portion responsive to the time to live information.

12. The method of claim 10, wherein said downloaded display portion comprises time to live information, and
 wherein said requesting of a new display portion and said creating a time stamp is directly responsive to one of:
  said displaying of said downloaded display portion; and
  expiration of said downloaded display portion responsive to the time to live information.

13. The method of claim 10, further comprising detecting a call instance termination,
 wherein said displaying of said downloaded display portion is responsive to said detected call instance termination.

14. The method of claim 10, further comprising:
 receiving a user input; and
 initiating a data connection to an address of a second network, the address responsive to said received user input and said displayed display portion,
 wherein said downloaded display portion is arranged to illustrate an advertisement associated with a particular provider, and
 wherein the address is associated with the particular provider of the advertisement illustrated by said displayed display portion.

15. The method of claim 10, further comprising outputting an audio portion at a call instance initiation, initiated by the telephone, such that at least a portion of the output audio portion is heard by a call initiator prior to call connection,
 wherein said displayed downloaded display portion is associated with said output audio portion.

16. The method of claim 10, further comprising:
 determining if a time stamp is stored on the memory of the telephone;
 determining if the telephone is in communication with the first network; and
 in the event said display agent determines that a time stamp is stored on said memory and determines that the telephone is in communication with the first network, transmitting to the first network said stored time stamp.

17. The method of claim 10, further comprising:
 transmitting said created time stamp to the first network;
 receiving said transmitted time stamp;
 comparing said received time stamp with time to live information associated with said downloaded display portion; and
 responsive to said comparing, determining if said downloaded display portion was displayed on the telephone.

18. The method of claim 17, further comprising:
 responsive to said determining, debiting a provider associated with said downloaded display portion.

19. A non-transitory computer readable medium having instructions stored thereon, which, when executed by one or more processors, causes the one or more processors to perform operations, the operations comprising:
 downloading a display portion from a first network to the telephone;
 detecting a call instance;
 displaying on the telephone said downloaded display portion responsive to said detected call instance;
 determining if the telephone is in communication with the first network;
 in the event the telephone is in communication with the first network, requesting a new display portion from the first network; and
 in the event the telephone is not in communication with the first network,
  creating a time stamp, and
  storing said created time stamp on a memory of the telephone.

20. The non-transitory computer readable medium of claim 19, wherein said downloaded display portion comprises time to live information, and
 wherein said requesting of a new display portion and said creating a time stamp is responsive to one of:
  said displaying of said downloaded display portion; and
  expiration of said downloaded display portion responsive to the time to live information.

21. The non-transitory computer readable medium of claim 19, wherein said downloaded display portion comprises time to live information, and
 wherein said requesting of a new display portion and said creating a time stamp is directly responsive to one of:
  said displaying of said downloaded display portion; and
  expiration of said downloaded display portion responsive to the time to live information.

22. The non-transitory computer readable medium of claim 19, wherein the operations further comprise:
 determining if a time stamp is stored on the memory of the telephone;
 determining if the telephone is in communication with the first network; and
 in the event said display agent determines that a time stamp is stored on said memory and determines that the telephone is in communication with the first network, transmitting to the first network, said stored time stamp.

23. The non-transitory computer readable medium of claim 19, wherein the operations further comprise:
 receiving a user input; and
 initiating a data connection to an address of a second network, the address responsive to said received user input and said displayed display portion,
 wherein said downloaded display portion is arranged to illustrate an advertisement associated with a particular provider, and
 wherein the address is associated with the particular provider of the advertisement illustrated by said displayed display portion.

24. The non-transitory computer readable medium of claim 19, wherein the operations further comprise outputting an audio portion at a call instance initiation, initiated by the telephone, such that at least a portion of the output audio portion is heard by a call initiator prior to call connection, and
 wherein said downloaded displayed display portion is associated with said output audio portion.

25. An apparatus for controlled display on a telephone, the telephone comprising a memory and a data communication module arranged to be in communication with a network, wherein the apparatus comprises:
 a controlled display agent on-board the telephone and in communication with the memory and the data communication module; and
 a controlled audio agent, said controlled audio agent associated with the telephone and in communication with an audio portion storage arranged to store an audio portion,
said controlled audio agent arranged to:
detect a first state of a call instance; and
output the audio portion stored on the audio portion storage responsive to said detected first state of a call instance initiation, such that at least a portion of said output audio portion is heard by a user of the telephone,
wherein said controlled display agent is arranged to:
download a display portion from the network to the memory via the data communication module;
detect a second state of the call instance, different than the first state of the call instance; and
display on the telephone said downloaded display portion responsive to said detected second state of the call instance,
wherein the displayed downloaded display portion is associated with said output audio portion.

26. The apparatus of claim 25, wherein said controlled display agent is on-board the telephone and is further arranged to download the audio portion from the audio portion storage via the data communication module.

27. The apparatus of claim 25, wherein the first state of a call instance is an initiation of the call instance and the second state of the call instance is a termination of the initiated call instance.

* * * * *